US009809010B2

(12) United States Patent
Lu et al.

(10) Patent No.: US 9,809,010 B2
(45) Date of Patent: Nov. 7, 2017

(54) MULTILAYER INTERLAYER HAVING SOUND DAMPING PROPERTIES OVER A BROAD TEMPERATURE RANGE

(71) Applicant: SOLUTIA INC., St. Louis, MO (US)

(72) Inventors: Jun Lu, East Longmeadow, MA (US); Wenjie Chen, Amherst, MA (US)

(73) Assignee: Solutia Inc., St. Louis, MI (US)

( * ) Notice: Subject to any disclaimer, the term of this patent is extended or adjusted under 35 U.S.C. 154(b) by 39 days.

(21) Appl. No.: 14/882,317

(22) Filed: Oct. 13, 2015

(65) Prior Publication Data

US 2016/0107424 A1   Apr. 21, 2016

Related U.S. Application Data

(63) Continuation-in-part of application No. 14/514,641, filed on Oct. 15, 2014, now Pat. No. 9,355,631.

(51) Int. Cl.

| | | |
|---|---|---|
| B32B 27/08 | (2006.01) | |
| B32B 7/02 | (2006.01) | |
| B32B 27/36 | (2006.01) | |
| B32B 27/42 | (2006.01) | |
| B32B 27/22 | (2006.01) | |
| B32B 27/30 | (2006.01) | |
| B60J 1/20 | (2006.01) | |
| E06B 5/12 | (2006.01) | |

(52) U.S. Cl.
CPC ............ *B32B 27/08* (2013.01); *B32B 7/02* (2013.01); *B32B 27/22* (2013.01); *B32B 27/30* (2013.01); *B32B 27/306* (2013.01); *B32B 27/308* (2013.01); *B32B 27/36* (2013.01); *B32B 27/365* (2013.01); *B32B 27/42* (2013.01); *B60J 1/2094* (2013.01); *E06B 5/12* (2013.01); *B32B 2250/24* (2013.01); *B32B 2270/00* (2013.01); *B32B 2307/102* (2013.01); *B32B 2307/536* (2013.01); *B32B 2307/56* (2013.01); *B32B 2419/00* (2013.01); *B32B 2605/006* (2013.01)

(58) Field of Classification Search
None
See application file for complete search history.

(56) References Cited

U.S. PATENT DOCUMENTS

| | | |
|---|---|---|
| 2,282,026 A | 5/1942 | Bren et al. |
| 2,282,057 A | 5/1942 | Hopkins et al. |
| 2,456,366 A | 12/1948 | Bren et al. |
| 3,644,594 A | 2/1972 | Mont |
| 4,165,397 A | 8/1979 | Ogden |
| 4,361,625 A | 11/1982 | Beckmann et al. |
| 4,874,814 A | 10/1989 | Cartier |
| 4,968,744 A | 11/1990 | Misra et al. |
| 5,169,897 A | 12/1992 | Walls |
| 5,190,826 A | 3/1993 | Asahina et al. |
| 5,290,660 A | 3/1994 | Eian et al. |
| 5,340,654 A | 8/1994 | Ueda et al. |
| 5,409,734 A | 4/1995 | Lee et al. |
| 5,593,786 A | 1/1997 | Parker et al. |
| 5,728,472 A | 3/1998 | D'Errico |
| 5,830,568 A | 11/1998 | Kondo |
| 6,733,872 B2 | 5/2004 | Nagai |
| 6,984,679 B2 | 1/2006 | Papenfuhs et al. |
| 7,121,380 B2 | 10/2006 | Garnier et al. |
| 7,452,608 B2 | 11/2008 | Fukatani et al. |
| 7,510,771 B2 | 3/2009 | Lu |
| 7,854,993 B2 | 12/2010 | Lu |
| 7,883,761 B2 | 2/2011 | Bourcier et al. |
| 8,470,908 B2 | 6/2013 | Frank |
| 8,597,792 B2 | 12/2013 | Meise et al. |
| 8,715,815 B2 | 5/2014 | Shimamoto |
| 8,741,439 B2 | 6/2014 | Shimamoto et al. |
| 8,920,930 B2 | 12/2014 | Meise et al. |
| 9,114,595 B2 | 8/2015 | Bourcier et al. |
| 9,238,354 B2 | 1/2016 | Iwamoto |
| 2003/0139520 A1 | 7/2003 | Toyoma |
| 2004/0065229 A1 | 4/2004 | Papenfuhs et al. |
| 2004/0219365 A1 | 11/2004 | Yuan |
| 2005/0142332 A1 | 6/2005 | Sauer |
| 2006/0008658 A1 | 1/2006 | Fukatani et al. |
| 2006/0210776 A1 | 9/2006 | Lu et al. |
| 2007/0036956 A1 | 2/2007 | Chen et al. |

(Continued)

FOREIGN PATENT DOCUMENTS

| | | |
|---|---|---|
| DE | 10343385 A1 | 4/2005 |
| DE | 102008001512 A1 | 11/2009 |

(Continued)

OTHER PUBLICATIONS

ChemicalBook, Triethylene glycol bis(2-ethylhexanoate), Access Jul. 13, 2015 by Examiner, First Page.
Ellis, Bryan and Ray Smith. "Polymers—A Property Database ($2^{nd}$ Edition)", Dec. 2009, Taylor & Francis, $2^{nd}$ Edition, p. 573.
Wade, B.E., Vinyl Acetal Polymers, in Encyclopedia of Polymer Science & Technology, 3rd edition, vol. 8, pp. 381-399, (2003).
Copending U.S. Appl. No. 14/299,945, filed Jun. 9, 2014, Jun Lu, et al. (Now Publication No. 2014-0363651).
Copending U.S. Appl. No. 14/300,612, filed Jun. 10, 2014, Jun Lu (Now Publication No. 2014-0364550).
Copending U.S. Appl. No. 14/299,975, filed Jun. 9, 2014, Jun Lu, et al. (Now Publication No. 2014-0363652).

(Continued)

*Primary Examiner* — Sheeba Ahmed
(74) *Attorney, Agent, or Firm* — Michelle Bugbee

(57) ABSTRACT

A polymer interlayer having improved sound insulation is disclosed. The polymer interlayer comprises: at least one soft layer wherein the soft layer comprises a poly(vinyl butyral) resin composition having a dispersity in composition of at least 0.40 and a plasticizer; and a stiff layer comprising a poly(vinyl butyral) resin composition and a plasticizer; wherein the polymer interlayer has a damping loss factor ($\eta$) (as measured by Mechanical Impedance Measurement according to ISO 16940) of at least about 0.15 measured at two or more different temperatures selected from 10° C., 20° C. and 30° C.

20 Claims, 6 Drawing Sheets

(56) References Cited

U.S. PATENT DOCUMENTS

| | | | |
|---|---|---|---|
| 2007/0122629 | A1 | 5/2007 | Chen et al. |
| 2007/0148472 | A1 | 6/2007 | Masaki et al. |
| 2007/0248809 | A1 | 10/2007 | Haldeman et al. |
| 2007/0289693 | A1 | 12/2007 | Anderson et al. |
| 2008/0268270 | A1 | 10/2008 | Chen et al. |
| 2008/0280076 | A1 | 11/2008 | Hayes et al. |
| 2008/0286542 | A1 | 11/2008 | Hayes |
| 2008/0306190 | A1 | 12/2008 | Weiss |
| 2009/0226750 | A1 | 9/2009 | Lu |
| 2009/0233090 | A1 | 9/2009 | Wong |
| 2009/0293952 | A1 | 12/2009 | Koran et al. |
| 2010/0028642 | A1* | 2/2010 | Steuer ............ B32B 17/10761 428/220 |
| 2010/0040868 | A1 | 2/2010 | Fukatani et al. |
| 2010/0124647 | A1 | 5/2010 | Keller et al. |
| 2012/0133764 | A1 | 5/2012 | Hurlbut |
| 2012/0263958 | A1 | 10/2012 | Iwamoto et al. |
| 2012/0288722 | A1 | 11/2012 | Iwamoto |
| 2013/0022824 | A1 | 1/2013 | Meise et al. |
| 2013/0022825 | A1 | 1/2013 | Meise et al. |
| 2013/0157065 | A1 | 6/2013 | Shimamoto et al. |
| 2013/0189527 | A1 | 7/2013 | Meise et al. |
| 2013/0236693 | A1 | 9/2013 | Lu |
| 2013/0236711 | A1 | 9/2013 | Lu |
| 2013/0274396 | A1 | 10/2013 | Arendt et al. |
| 2013/0323516 | A1 | 12/2013 | Shimamoto et al. |
| 2014/0000977 | A1 | 1/2014 | Matsuda et al. |
| 2014/0363651 | A1 | 12/2014 | Lu et al. |
| 2014/0363652 | A1 | 12/2014 | Lu et al. |
| 2014/0364549 | A1 | 12/2014 | Lu et al. |
| 2014/0364550 | A1 | 12/2014 | Lu |
| 2015/0158276 | A1 | 6/2015 | Thompson et al. |
| 2015/0258747 | A1 | 9/2015 | Miyai |
| 2015/0306853 | A1 | 10/2015 | Beekhuizen |
| 2016/0046783 | A1 | 2/2016 | Asanuma |
| 2016/0046784 | A1 | 2/2016 | Asanuma |

FOREIGN PATENT DOCUMENTS

| | | |
|---|---|---|
| JP | 05-104687 A | 4/1993 |
| JP | 05-310449 A | 11/1993 |
| JP | 09-156967 A | 6/1997 |
| WO | WO 2010/108975 A1 | 9/2010 |
| WO | WO 2012/092366 | 7/2012 |

OTHER PUBLICATIONS

Copending U.S. Appl. No. 14/299,996, filed Jun. 9, 2014, Jun Lu, et al. (Now Publication No. 2014-0364549).
PCT International Search Report and Written Opinion dated Aug. 29, 2014 for International Application No. PCT/US2014/041698.
Copending U.S. Appl. No. 14/505,191, filed Oct. 2, 2014, Jun Lu.
Copending U.S. Appl. No. 14/505,247, filed Oct. 2, 2014, Jun Lu.
Copending U.S. Appl. No. 14/514,641, filed Oct. 15, 2014, Jun Lu.
Copending U.S. Appl. No. 14/563,352, filed Dec. 8, 2014, Zhou Li, et al.
Copending U.S. Appl. No. 14/563,359, filed Dec. 8, 2014, Jun Lu, et al.
Copending U.S. Appl. No. 14/563,364, filed Dec. 8, 2014, Jun Lu, et al.
Copending U.S. Appl. No. 14/563,372, filed Dec. 8, 2014, Jun Lu, et al.
Copending U.S. Appl. No. 14/563,373, filed Dec. 8, 2014, Jun Lu, et al.
Copending U.S. Appl. No. 14/563,378, filed Dec. 8, 2014, Jun Lu, et al.
Copending U.S. Appl. No. 14/563,622, filed Dec. 8, 2014, Jun Lu, et al.
Copending U.S. Appl. No. 14/563,719, filed Dec. 8, 2014, Jun Lu, et al.
Copending U.S. Appl. No. 14/563,011, filed Dec. 8, 2014, Jun Lu.
Copending U.S. Appl. No. 14/563,381, filed Dec. 8, 2014, Jun Lu, et al.
PCT International Search Report and Written Opinion dated Jan. 22, 2015 for International Application No. PCT/US2014/041689.
Office Action dated Apr. 6, 2015 received in co-pending U.S. Appl. No. 14/300,612.
Office Action dated Apr. 15, 2015 received in co-pending U.S. Appl. No. 14/299,996.
Office Action dated Jul. 6, 2015 received in co-pending U.S. Appl. No. 14/299,975.
Office Action dated Jul. 8, 2015 received in co-pending U.S. Appl. No. 14/299,945.
Office Action dated Jul. 27, 2015 received in co-pending U.S. Appl. No. 14/505,191.
Office Action dated Jul. 27, 2015 received in co-pending U.S. Appl. No. 14/505,247.
Office Action dated Aug. 5, 2015 received in co-pending U.S. Appl. No. 14/300,612.
USPTO Notice of Allowance dated Sep. 9, 2015 for copending U.S. Appl. No. 14/299,996.
Office Action dated Nov. 2, 2015 received in co-pending U.S. Appl. No. 14/514,641.
Sigma-Aldrich®. "Poly(3-methyl-1,5-pentanediol Adipate)," Retrieved Apr. 11, 2016, p. 1.
Sigma-Aldrich "Di(propylene glycol) dibenzoate" retrieved Jul. 1, 2016, 3 pages.
Office Action dated Dec. 3, 2015 received in co-pending U.S. Appl. No. 14/299,945.
USPTO Notice of Allowance dated Nov. 20, 2015 for copending U.S. Appl. No. 14/300,612.
Copending U.S. Appl. No. 14/973,547, filed Dec. 17, 2015, Jun Lu.; now U. S. Publication No. 2016/0102181.
Office Action dated Nov. 30, 2015 received in co-pending U.S. Appl. No. 14/299,975.
Copending U.S. Appl. No. 14/973,500, filed Dec. 17, 2015, Lu et al.; now U. S. Publication No. 2016/0101605.
Co-pending U.S. Appl. No. 14/563,347, filed Dec. 8, 2014; Jun Lu and Yalda Farhoudi; now U. S. Publication No. 2016-0160025.
Office Action dated Jan. 21, 2016 received in co-pending U.S. Appl. No. 14/563,347.
Office Action dated May 2, 2016 received in co-pending U.S. Appl. No. 14/563,347.
Office Action dated Nov. 6, 2015 received in co-pending U.S. Appl. No. 14/563,372.
Office Action dated Mar. 22, 2016 received in co-pending U.S. Appl. No. 14/563,372.
USPTO Notice of Allowance dated Apr. 20, 2016 for copending U.S. Appl. No. 14/563,372.
USPTO Notice of Allowance dated Feb. 5, 2016 for copending U.S. Appl. No. 14/514,641.
Copending U.S. Appl. No. 15/051,222, filed Feb. 23, 2016, Jun Lu; now U. S. Publication No. 2016-0171961.
Office Action dated Jun. 15, 2016, 2016 received in co-pending U.S. Appl. No. 15/051,222.
Office Action dated Apr. 21, 2016 received in co-pending U.S. Appl. No. 14/505,191.
Office Action dated Dec. 31, 2015 received in co-pending U.S. Appl. No. 14/505,247.
Office Action dated Apr. 22, 2016 received in co-pending U.S. Appl. No. 14/505,247.
USPTO Notice of Allowance dated Nov. 24, 2015 for copending U.S. Appl. No. 14/299,996.
Copending U.S. Appl. No. 15/051,183, filed Feb. 23, 2016, Spangler et al.; now U. S. Publication No. 2016-0168353.
PCT International Search Report and Written Opinion dated Jan. 26, 2016 for International Application No. PCT/US2015/063907.
PCT International Search Report and Written Opinion dated May 23, 2016 for International Application No. PCT/US2015/063908.
PCT International Search Report and Written Opinion dated Jan. 26, 2016 for International Application No. PCT/US2015/063885.
PCT International Search Report and Written Opinion dated Jan. 7, 2016 for International Application No. PCT/US2015/055633.
PCT International Search Report and Written Opinion dated Nov. 19, 2015 for International Application No. PCT/US2015/051591.

(56) References Cited

OTHER PUBLICATIONS

PCT International Search Report and Written Opinion dated Nov. 19, 2015 for International Application No. PCT/US2015/051593.
PCT International Search Report and Written Opinion dated Apr. 18, 2016 for International Application No. PCT/US2015/063933.
PCT International Search Report and Written Opinion dated Mar. 29, 2016 for International Application No. PCT/US2015/063944.
PCT International Search Report and Written Opinion dated Jan. 26, 2016 for International Application No. PCT/US2015/063975.
Notification of Transmittal of the International Search Report and the Written Opinion of the International Searching Authority, or the Declaration dated Jul. 1, 2016 received in International Application No. PCT/US201/063900.
Office Communication notification dated Jul. 11, 2016 received in U.S. Appl. No. 14/587,702.
http://www.chemicalbook.com/ChemicalProductProperty_EN_CB0225180.htm; Jul. 2011.
Dupont, Untitled [discloses comparisons between PVB and SGP interlayers used in safety glass], accessed on Sep. 12, 2016, Dupont.com, obtained from http://www2.dupont.com/Building_Innovations/zh_CN/assets/downloads/SGPintro_E.pdf.
PubChem, Glutaraldehyde, accessed on Sep. 12, 2016, NIH.gov, obtained from https://pubchem.ncbi.nlm.nih.gov/compound/glotaraldehyde#section=Top.
Sigma-Aldrich, Tri(ethylene glycol) bis(2-ethylhexanoate), accessed on Sep. 12, 2016, Sigmaaldrich.com, obtained from http://www.sigmaaldrich.com/catalog/product/aldrich/525103?lang-en®ion=US.
AzoM, Indium Tin Oxide (ITO)—Properties and Applications, Jan. 23, 2004, Azo Materials, obtained from http://www.azom.com/article.aspx?ArticleID=2349.
"Aerosil MOX 170 MSDS"; Evonik Industries, Jun. 25, 2016; pp. 1-12.
Office Action dated Oct. 4, 2016 received in co-pending U.S. Appl. No. 14/299,945.
Office Action dated Aug. 22, 2016 received in co-pending U.S. Appl. No. 14/563,347.
Office Action dated Aug. 12, 2016 received in co-pending U.S. Appl. No. 14/563,364.
Office Communication received in co-pending U.S. Appl. No. 14/563,372 notification date Aug. 3, 2016.
Copending U.S. Appl. No. 15/246,810, filed Aug. 25, 2016; Jun Lu et al.
Notice of Allowance and Fee(s) Due dated Aug. 12, 2016 received in co-pending U.S. Appl. No. 15/051,222.
Copending U.S. Appl. No. 15/248,502, filed Aug. 26, 2016; Jun Lu.
Office Action dated Oct. 6, 2016 received in co-pending U.S. Appl. No. 14/563,378.
Office Action dated Sep. 16, 2016 received in co-pending U.S. Appl. No. 14/563,011.
Hallensleben, Manfred L. et al.; "Polyvinyl Compounds, Others"; Ullmann's Encyclopedia of Industrial Chemistry; Jul. 2015; pp. 1-23.
Naje, Asama Natik, et al.; "Effect of Indium Tin Oxide (ITO) Nanoparticles on the Optical Properties of PMMA Polymer"; Journal of University of Kerbala, The International 3$^{rd}$ Scientific Conference of the College of Science; 2015; pp. 17-23.
"Chemical Information Profile for Indium Tin Oxide"; National Toxicology Program; Jun. 2009; pp. 1-28.
Althues, H. et al.; "Functional inorganic nanofillers for transparent polymers"; Chemical Society Reviews; Mar. 2007; pp. 1454-1465.
Wypych, George; "Sources of Fillers, Their Chemical Composition, Properties, and Morphology"; Handbook of Fillers, 2$^{nd}$ Edition; 2000; pp. 19-177.
Reis, Joao Carlos R. et al.; "Refractive Index of Liquid Mixtures: Theory and Experiment"; ChemPhysChem; 2010; pp. 3722-3733.
"UNIPLEX 988 and UNIPLEX 988S" Technical Information: Lanxess Deutschland GmbH; 2012; pp. 2.
"BUTVAR polyvinyl butyral resin—Properties and uses" Technical Information; 2013; pp. 1-29.
Copending U.S. Appl. No. 15/474,105, filed Mar. 30, 2017, Jun Lu.
Copending U.S. Appl. No. 15/438,243, filed Feb. 21, 2017, Lu et al.
Co-pending U.S. Appl. No. 15/428,557, filed Feb. 9, 2017, Jun Lu and Yalda Farhoudi.
Co-pending U.S. Appl. No. 15/376,849, filed Dec. 13, 2016; Lu and Li; now U. S. Patent Publication No. 2017-0087813.
Co-pending U.S. Appl. No. 15/427,798, filed Feb. 8, 2017.
Co-pending U.S. Appl. No. 15/427,844, filed Feb. 8, 2017; Lu and Li.
Office Action dated Nov. 21, 2016 received in co-pending U.S. Appl. No. 14/505,191.
Office Action dated May 8, 2017 received in co-pending U.S. Appl. No. 14/505,191.
Office Action dated Nov. 25, 2016 received in co-pending U.S. Appl. No. 14/505,247.
Office Action dated Apr. 27, 2017 received in co-pending U.S. Appl. No. 14/563,378.
Office Action dated Mar. 9, 2017 received in co-pending U.S. Appl. No. 14/563,622.
Office Action dated Mar. 9, 2017 received in co-pending U.S. Appl. No. 14/563,719.
Office Action dated Apr. 28, 2017 received in co-pending U.S. Appl. No. 14/563,381.
Notification of Transmittal of the International Search Report and the Written Opinion of the International Searching Authority, or the Declaration dated May 9, 2017 received in International Application No. PCT/US2017/016898.
Office Action dated Feb. 1, 2017 received in co-pending U.S. Appl. No. 14/587,702.
parchem.com, cinnamaldehyde, 2017, obtain from www.parchem.com/cinnamaldehyde-getpdf-011158.aspx.
parchem.com, Dipropylene Glycol Dibenzoate, 2017, obtained from http://www.parchem.com/chemical-supplier-distributor/Dipropylene-Glycol-Dibenzoate-012292.aspx.
Examiner's Answer dated Jun. 27, 2017 received in co-pending U.S. Appl. No. 14/299,945.
Office Action dated Jul. 14, 2017 received in U.S. Appl. No. 14/563,359.
Office Action dated May 23, 2017 received in co-pending U.S. Appl. No. 14/563,011.

\* cited by examiner

MULTILAYER INTERLAYER HAVING SOUND DAMPING PROPERTIES OVER A BROAD TEMPERATURE RANGE

CROSS REFERENCE TO RELATED APPLICATION(S)

This application is a continuation-in-part of U.S. patent application Ser. No. 14/514,641, filed Oct. 15, 2014, the entire disclosure of which is incorporated by reference herein.

BACKGROUND OF THE INVENTION

Field of the Invention

This disclosure is related to the field of polymer interlayers for multiple layer glass panels and multiple layer glass panels having at least one polymer interlayer sheet. Specifically, this disclosure is related to the field of acoustic polymer interlayers comprising multiple thermoplastic polymer layers.

Description of Related Art

Multiple layer panels are generally panels comprised of two sheets of a substrate (such as, but not limited to, glass, polyester, polyacrylate, or polycarbonate) with one or more polymer interlayers sandwiched therebetween. The laminated multiple layer glass panels are commonly utilized in architectural window applications and in the windows of motor vehicles and airplanes. These applications are commonly referred to as laminated safety glass. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

The thermoplastic polymer found in safety glass can consist of a single layer of a thermoplastic polymer, such as poly(vinyl acetal) or poly(vinyl butyral) (PVB), that has had one or more physical characteristics modified in order to reduce the sound transmission through the glass. Conventional attempts at such acoustic dampening have included using thermoplastic polymers with low glass transition temperatures. Other attempts have included multilayer interlayers using two or more (such as three) adjacent layers of thermoplastic polymer wherein the layers have dissimilar characteristics (see, for example U.S. Pat. Nos. 5,340,654, 5,190,826, and 7,510,771). These multilayer interlayers typically comprise a soft layer having a single poly(vinyl acetal) resin having low residual hydroxyl content and two stiffer outer layers having a poly(vinyl acetal) resin having a significantly higher residual hydroxyl content. The soft layer provides acoustic damping properties, while the stiff layers provide handling, processing and mechanical strength of the interlayer. The stiff outer layers generally contribute very little to the acoustic damping properties.

Previous attempts to produce multiple layer interlayers (comprising at least two adjacent polymer layers) that reduce sound transmission through a multiple layer glass panel have relied on various compositional permutations or differences between the two or more layers. Conventional multiple layer interlayers have a soft layer that has a single resin and exhibits a single glass transition temperature and a lower dispersity in composition. One prior art method teaches the use of acetals of differing carbon length (see, for example, U.S. Pat. No. 5,190,826). Another prior art method teaches the use of differing polymerization degrees (see, for example, Japanese Patent Application 3124441A or U.S. Patent Application 2003/0139520 A1). Another method of varying the layers is the use of a PVB resin having residual acetate levels of at least 5 mole % in one of two adjacent layer as a compositional difference (see, for example, Japanese Patent 3,377,848 and U.S. Pat. No. 5,340,654). Finally, other methods use poly(vinyl butyral) resins having different plasticizer concentrations (see, for example, U.S. Pat. No. 7,510,771). All of these interlayers provide sound insulation properties only within a narrow temperature range and have resin compositions having a narrow distribution and low dispersity in composition.

In these interlayers, the residual hydroxyl content in the soft layer poly(vinyl acetal) resin and the amount of the plasticizer have been optimized such that the interlayer provides optimal sound insulation properties at ambient application temperatures for multiple layer glass panels, such as windshields and windows installed on vehicles and buildings, but at temperatures above or below the ambient temperature, the sound insulation properties may deteriorate significantly. For example, if the multilayer interlayer composition has been optimized such that the multiple layer glass panel comprising the multilayer interlayer has a maximum sound insulation performance at 20° C. in its coincident frequency region (such as in the region around 5,000 Hz), changing the application temperature by about 10° C. (decreasing the temperature to 10° C. or increasing the temperature to 30° C.) decreases the sound insulation significantly, such as by several decibels or more. Further lowering or increasing the temperature reduces the sound insulation performance even more.

Further, multiple layer glass panels produced with conventional multilayer interlayers can have desirable sound insulation in one region of the world at ambient temperatures, but in other regions of the world where the ambient temperatures differ the sound insulation may be lower or performance may only be mediocre. Even in the same world region, as the seasons change throughout the year and temperatures increase or decrease significantly, the sound insulation ability of the glass panels also changes.

Accordingly, there is a need in the art for the development of a multilayer interlayer that has sound insulation performance over a broad temperature range instead of only at one temperature, such as ambient temperature. More specifically, there is a need in the art for the development of multilayer interlayers having at least one soft layer that provides sound insulation performance over a broad temperature range.

SUMMARY OF THE INVENTION

Because of these and other problems in the art, described herein, among other things are multilayered interlayers comprised of a stiff layer or layers and a soft layer(s) where the soft layer comprises a resin composition having a broader distribution (or a higher dispersity) in composition. The multilayer interlayer comprising a resin composition having high dispersity in composition has good acoustic performance over a broader temperature range than other conventional multilayer interlayers. In an embodiment, these multilayered interlayers comprise: a first polymer layer (stiff layer) comprising plasticized poly(vinyl butyral) resin; a second polymer layer (soft layer) comprising a plasticized poly(vinyl butyral) resin having a high dispersity in composition; and a third polymer layer (stiff layer) comprising plasticized poly(vinyl butyral) resin. In embodiments, the second polymer layer is disposed between the first polymer layer and the third polymer layer, resulting in two stiff outer (skin) layers and a central soft (core) layer. In embodiments, the second polymer layer comprises a blend of two or more plasticized poly(vinyl butyral) resins having different residual hydroxyl contents, different residual acetate contents, or both. In embodiments, the soft layer comprises a resin having a high dispersity in composition that is produced by blending two or more resins. In other embodiments, the soft layer comprises a resin composition having a high dispersity in composition made as further described herein.

In an embodiment, a polymer interlayer having improved sound insulation is disclosed, the polymer interlayer comprising: a stiff layer comprising a poly(vinyl butyral) resin composition and a plasticizer; and a soft layer comprising a poly(vinyl butyral) resin composition and a plasticizer, wherein the soft layer has a dispersity in composition of at least 0.40; and wherein the polymer interlayer has a damping loss factor (η) (as measured by Mechanical Impedance Measurement according to ISO 16940) of at least about 0.15 measured at two or more different temperatures selected from 10° C., 20° C. and 30° C.

In another embodiment, a polymer interlayer having improved sound insulation is disclosed, the polymer interlayer comprising: a stiff layer comprising a poly(vinyl butyral) resin composition and a plasticizer; and a soft layer comprising a poly(vinyl butyral) resin composition, wherein the soft layer comprises a first poly(vinyl butyral) resin having a first dispersity in composition and a second poly(vinyl butyral) resin having a second dispersity in composition, and a plasticizer, wherein the soft layer has a third dispersity in composition and wherein the third dispersity in composition is at least 0.40 and wherein the third dispersity in composition is greater than both the first dispersity in composition and the second dispersity in composition; and wherein the polymer interlayer has a damping loss factor (η) (as measured by Mechanical Impedance Measurement according to ISO 16940) of at least about 0.15 measured at two or more different temperatures selected from 10° C., 20° C. and 30° C.

In another embodiment, a polymer interlayer having improved sound insulation is disclosed, the polymer interlayer comprising: a stiff layer comprising a poly(vinyl butyral) resin composition and a plasticizer; and a soft layer comprising a poly(vinyl butyral) resin composition and a plasticizer, wherein the soft layer resin composition has an average residual hydroxyl content of from about 8 to about 16 weight % and a dispersity in composition of at least 0.40, wherein the polymer interlayer has a damping loss factor (η) (as measured by Mechanical Impedance Measurement according to ISO 16940) of at least about 0.15 measured at two or more different temperatures selected from 10° C., 20° C. and 30° C.

In embodiments, the poly(vinyl butyral) resin composition in the soft layer comprises a first poly(vinyl butyral) resin having a first residual hydroxyl content and a second poly(vinyl butyral) resin having a second residual hydroxyl content, wherein the difference between the first residual hydroxyl content and the second residual hydroxyl content is at least 1.0 weight percent.

In embodiments, the dispersity in composition of the resin composition in the soft layer is greater than the dispersity in composition of the first poly(vinyl butyral) resin in the soft layer and the dispersity in composition of the second poly(vinyl butyral) resin in the soft layer.

In embodiments, the poly(vinyl butyral) resin composition in the soft layer comprises a first poly(vinyl butyral) resin having a first residual vinyl acetate content and a second poly(vinyl butyral) resin having a second residual vinyl acetate content, wherein the difference between the first residual vinyl acetate content and the second residual vinyl acetate content is at least 1.0 mole %.

In embodiments, the dispersity in composition of the resin composition in the soft layer is greater than the dispersity in composition of the first poly(vinyl butyral) resin in the soft layer and the dispersity in composition of the second poly(vinyl butyral) resin in the soft layer.

In embodiments, the plasticized resin composition in the soft layer of the polymer interlayer has a glass transition temperature ($T_g$) less than 20.0° C.

In embodiments, the resin composition in the soft layer is produced by the process of reacting a first poly(vinyl alcohol) resin having a first degree of hydrolysis with a butyraldehyde to form a reaction mixture, adding a second poly(vinyl alcohol) resin with a second degree of hydrolysis to the reaction mixture, and allowing the second poly(vinyl alcohol) resin to react with the butyraldehyde to form a resin having a dispersity in composition of at least 0.40.

In embodiments, the resin composition in the soft layer is produced by the process of mixing a first poly(vinyl alcohol) resin and a second poly(vinyl alcohol) resin composition to form a mixture, wherein the first poly(vinyl alcohol) resin and a second poly(vinyl alcohol) resin composition each have a degree of hydrolysis and the difference between the degree of hydrolysis of the first poly(vinyl alcohol) resin and a second poly(vinyl alcohol) resin is at least 2%, wherein the mixture is reacted with butyraldehyde to produce a resin having a dispersity in composition of at least 0.40.

In embodiments, the polymer interlayer further comprises a second stiff layer, and wherein the soft layer is adjacent to and between the stiff layers.

In embodiments, the third dispersity in composition is at least 10% greater than the first dispersity in composition and at least 10% greater than the second dispersity in composition.

In embodiments, the soft layer poly(vinyl butyral) resin composition has an average residual vinyl acetate content of from about 1 mole % to about 28 mole %.

In embodiments, the poly(vinyl butyral) resin composition in the soft layer comprises a first poly(vinyl butyral) resin having a first residual hydroxyl content and a first dispersity in composition and a second poly(vinyl butyral) resin having a second residual hydroxyl content and a second dispersity in composition, wherein the difference between the first residual hydroxyl content and the second residual hydroxyl content is at least 1.0 weight percent, and wherein the soft layer has a third dispersity in composition of at least 0.40 and wherein the third dispersity in composition is greater than both the first dispersity in composition and the second dispersity in composition A multiple layer panel is also disclosed. The multiple layer panel comprises at least one rigid substrate, and in some embodiments, two rigid substrates, such as glass, and a polymer interlayer or multiple layer polymer interlayer as disclosed herein. The panel has improved sound insulation properties.

A method of making a polymer interlayer is also disclosed, wherein the polymer interlayer has improved sound insulation, the polymer interlayer comprising at least one soft layer and one stiff layer as disclosed herein.

A method of making a polymer interlayer is also disclosed, wherein the polymer interlayer has improved sound insulation, wherein the polymer interlayer comprises at least one soft layer and one stiff layer, wherein the resin composition in the soft layer is produced by the process of reacting a first poly(vinyl alcohol) resin having a first degree of hydrolysis with a butyraldehyde to form a reaction mixture, adding a second poly(vinyl alcohol) resin with a second degree of hydrolysis to the reaction mixture, and allowing the second poly(vinyl alcohol) resin to react with the butyraldehyde to form a resin having a dispersity in composition of at least 0.40.

A method of making a polymer interlayer is also disclosed, wherein the polymer interlayer has improved sound insulation, wherein the polymer interlayer comprises at least one soft layer and one stiff layer, wherein the resin composition in the soft layer is produced by the process of mixing a first poly(vinyl alcohol) resin and a second poly(vinyl alcohol) resin composition to form a mixture, wherein the first poly(vinyl alcohol) resin and a second poly(vinyl alcohol) resin composition each have a degree of hydrolysis and the difference between the degree of hydrolysis of the first poly(vinyl alcohol) resin and a second poly(vinyl alcohol) resin is at least 2%, wherein the mixture is reacted with butyraldehyde to produce a resin having a dispersity in composition of at least 0.40.

DESCRIPTION OF THE PREFERRED EMBODIMENT(S)

Figure 1:
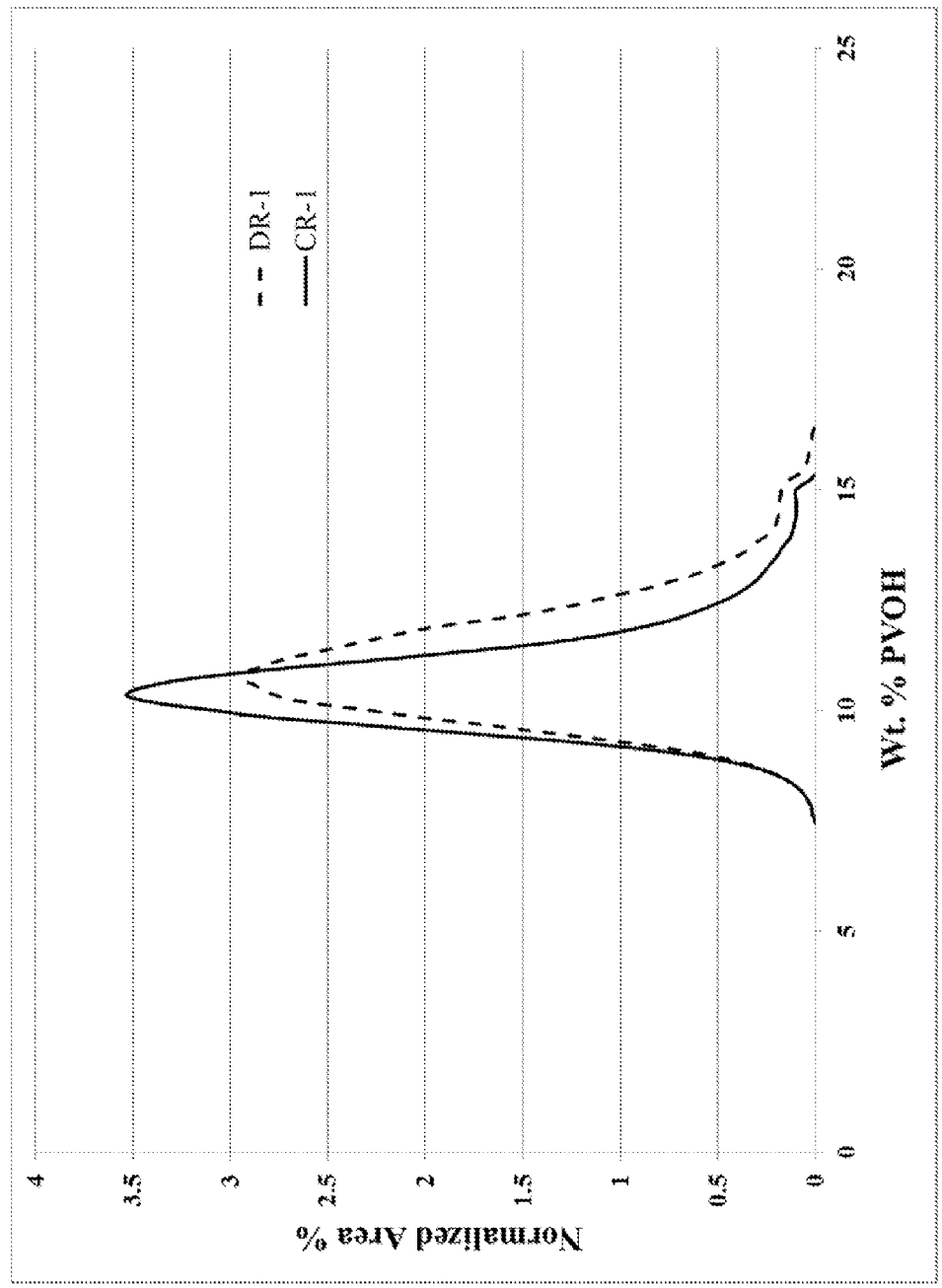
FIG. 1 is a chart showing the distribution of a resin composition for a disclosed core layer resin (DR-1) and a comparative core layer resin (CR-1).

Described herein, among other things, are multilayer interlayers having improved sound insulation over a broad temperature range comprised of at least one soft layer comprising a resin having a high dispersity in composition, and at least one stiff layer, wherein the dispersity in composition (as defined below) in the soft layer resin is at least 0.40. In embodiments, the polymer interlayer has a damping loss factor ($\eta$) (as measured by Mechanical Impedance Measurement according to ISO 16940) of at least about 0.15 measured at two or more different temperatures selected from 10° C., 20° C. and 30° C., or at least 0.16, or at least 0.17, or at least 0.18, or at least 0.19, or at least 0.20, or at least 0.21, or at least 0.22, or at least 0.23, or at least 0.24, or at least 0.25 or higher, measured at two or more different temperatures selected from 10° C., 20° C. and 30° C.

It is possible to produce a soft layer resin composition having a broader distribution or high dispersity (i.e., at least 0.40 or higher) in several ways, as described below. The resin composition may have a dispersity of greater than 0.40, or at least 0.41, or at least 0.42, or at least 0.43, or at least 0.44, or at least 0.45, or at least 0.50, or at least 0.55, or at least 0.60, or at least 0.65 or more.

A characteristic feature of co-polymer, ter-polymer or multi-monomeric polymers is their dispersity in chemical composition, such as, for example, in the amount of residual hydroxyl groups and/or residual vinyl acetate groups, or other groups, in the polymer. The composition of individual monomeric groups or functional groups in the polymers has a distribution around an average value. As used herein, this distribution of the chemical composition is referred to as "dispersity in composition" or "dispersity in resin composition", and the terms may be used interchangeably herein.

As used herein, an "interlayer" is any thermoplastic construct that can be used in multiple layer glass applications, such as safety glass in windshields and architectural windows. The terms "multilayer" and "multiple layers" mean an interlayer having more than one layer, and multilayer and multiple layer may be used interchangeably. Multilayer interlayers typically contain at least one soft layer and at least one stiff layer. In some embodiments, the soft layer(s) may be adjacent and/or between one or more stiff layers, and the soft layer, when between two stiffer layers, may be referred to as a core layer, and the stiffer, outer layers may be referred to as skin layers. In other embodiments, the core layer may be stiffer than the outer or skin layers, providing an interlayer having softer outer or skin layers and a stiff core layer. In other embodiments, the multilayer interlayer comprises more than three layers.

As used herein, when referring to layers of the polymer interlayer, a "soft layer" or "softer layer" is a layer that has a glass transition temperature that is lower than that of another layer in the interlayer or relative to another layer. As used herein, a "stiff layer" or "stiffer layer" is a layer that has a glass transition temperature that is higher than that of another layer in the interlayer or relative to another layer. The terms soft or softer and stiff or stiffer are relative characteristics of the layer and for comparison of two or more layers.

Examples of polymer resins having a broad distribution or high dispersity in composition include resins such as poly (vinyl acetal) resin. Conventional poly(vinyl acetal) resins can be formed by acetalization of poly(vinyl alcohol) with one or more aldehydes (such as butyraldehyde) in the presence of an acid catalyst. The resulting poly(vinyl acetal) resin can then be separated, stabilized, and dried according to known methods such as, for example, those described in U.S. Pat. Nos. 2,282,057 and 2,282,026, as well as "Vinyl Acetal Polymers," in the *Encyclopedia of Polymer Science & Technology*, 3$^{rd}$ ed., Volume 8, pages 381-399, by B. E. Wade (2003). The total amount of residual aldehyde groups, or residues, present in the resulting poly(vinyl acetal) resin can be measured by ASTM D-1396 or by a near infrared measurement calibrated from hundreds of titrations similar to the ASTM D-1396 titration method. The total amount of aldehyde residues in a poly(vinyl acetal) resin can be collectively referred to as the acetal component, with the balance of the poly(vinyl acetal) resin comprising residual hydroxyl or acetate groups.

The poly(vinyl acetal) resins, such as poly(vinyl butyral) resin, described herein typically include residual hydroxyl and/or residual acetate groups. As used herein, the terms "residual hydroxyl content" and "residual acetate content" or "residual vinyl acetate content" refer to the amount of hydroxyl and acetate groups, respectively, that remain on a resin after processing is complete. For example, poly(vinyl butyral) can be produced by hydrolyzing polyvinyl acetate to poly(vinyl alcohol), and then acetalizing the poly(vinyl alcohol) with butyraldehyde to form poly(vinyl butyral). In the process of hydrolyzing the polyvinyl acetate, not all of the acetate groups are converted to hydroxyl groups, and residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl groups or % vinyl hydroxyl content) and residual acetate groups (as vinyl acetate groups or % vinyl acetate content) as part of the polymer chain. The residual hydroxyl content is expressed in weight percent and residual acetate content is expressed in mole percent or weight percent. Both residual hydroxyl content and residual acetate content are measured according to ASTM D-1396 or the similar method previously discussed.

In various embodiments, the polymer can be any polymer suitable for use in a multiple layer panel. Typical polymers include, but are not limited to, polyvinyl acetals (PVA) (such as poly(vinyl butyral) (PVB) or poly(vinyl isobutyral), an isomer of poly(vinyl butyral) and also referred as PVB or PVisoB, aliphatic polyurethane (PU), poly(ethylene-co-vinyl acetate) (EVA), polyvinylchloride (PVC), poly(vinyl-chloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins, combinations of the foregoing, and the like. PVB and its isomer polyvinyl isobutyral, polyvinyl chloride, ionomers, and polyurethane are suitable polymers generally for interlayers; PVB and its isomer are particularly suitable. Polyurethanes can have different hardnesses. An exemplary polyurethane polymer has a Shore A hardness less than 85 per ASTM D-2240. Examples of polyurethane polymers are AG8451 and AG5050, aliphatic isocyanate polyether based polyurethanes having glass transition temperatures less than 20° C. (commercially available from Thermedics Inc. of Woburn, Mass.). EVA polymers (or copolymers) can contain various amounts of vinyl acetate groups. The desirable vinyl acetate content is generally from about 10 to about 90 mole %. EVA with lower vinyl acetate content can be used for sound insulation at low temperatures. The ethylene/carboxylic acid copolymers are generally poly(ethylene-co-methacrylic acid) and poly(ethylene-co-acrylic acid) with the carboxylic acid content from 1 to 25 mole %. Ionomers of ethylene/carboxylic acid copolymers can be obtained by partially or fully neutralizing the copolymers with a base, such as the hydroxide of alkali (sodium for example) and alkaline metals (magnesium for example), ammonia, or other hydroxides of transition metals such as zinc. Examples of ionomers of that are suitable include Surlyn® ionomers resins (commercially available from DuPont of Wilmington, Del.).

Examples of exemplary multilayer interlayer constructs include, but are not limited to, PVB//PVB//PVB, PVB//PVisoB//PVB, where PVB or PVisoB layer comprises two or more resins having different residual hydroxyl contents or different polymer compositions; PVC//PVB//PVC, PU//PVB//PU, Ionomer//PVB//Ionomer, Ionomer//PU//Ionomer, Ionomer//EVA//Ionomer, where the soft layer PVB (including PVisoB), PU or EVA comprises two or more resins having different glass transitions. Alternatively, the stiff and soft layers may all be PVB using the same or different starting PVB resins. Other combinations of resins and polymers will be apparent to those skilled in the art.

One method for achieving a broad distribution or high dispersity in composition for a resin composition, such as a poly(vinyl acetal) or PVB resin, is to have a mixture of a first and second resin wherein the residual hydroxyl content (measured as % PVOH by weight) of the second resin is different from the residual hydroxyl content of the first resin. Another method is to have a mixture of a first and second resin wherein the residual vinyl acetate content (measured as % PVAc by mole or by weight) of the second resin is different from the residual vinyl acetate content of the first resin. Finally, another method is to have a mixture of a first and second resin wherein both the residual hydroxyl content and the residual vinyl acetate content of the second resin is different from the residual hydroxyl content and the residual vinyl acetate content of the first resin.

A broad distribution or high dispersity in composition can be achieved, for example, by blending two or more different resins together to form a mixture of resins, wherein the individual resins have different residual hydroxyl contents, residual vinyl acetate contents, or both. By starting with two or more different resins having different residual hydroxyl and/or vinyl acetate contents, a resin composition having a high dispersity in composition can be achieved.

Another way to obtain a resin composition having a high dispersity is by mixing at least two (or more) poly(vinyl alcohol) (PVOH) resins of different compositions (i.e., different hydrolysis levels or different degrees of hydrolysis) to form a mixture and reacting the mixture with an aldehyde, such as butyraldehyde, to produce a resin having a broad distribution or high dispersity in composition. For example, two (or more) different PVOH resins can be mixed where at least one of the PVOH resins has a degree of hydrolysis of about 95% or higher and the other PVOH resin has a degree of hydrolysis of about 93% or lower (or stated differently, there is a difference between the hydrolysis levels, such as, for example, of at least 2%). By mixing the two different PVOH resins and reacting them with an aldehyde (such as butyraldehyde), the resulting resin composition will be a resin blend or mixture having a difference in residual vinyl alcohol contents, such as a difference of about 2% or more. Similarly, two (or more) PVOH resins having different levels of residual vinyl acetate, such as, for example, a PVOH resin having about 5 mole % or lower residual vinyl acetate, and a PVOH resin having about 7 mole % or higher residual vinyl acetate, may be mixed or blended and reacted with an aldehyde, such as butyraldehyde. The resulting resin composition will be a mixture of resins of different starting compositions or properties, such as different PVOH levels, or different PVAc levels, or both, and the composition will have a high dispersity.

Another method for achieving a resin composition having a broad distribution or high dispersity is by reacting a PVOH resin first with an aldehyde, such as butyraldehyde, and then adding a second PVOH resin to the reaction mixture and allowing it to react with the aldehyde. Variables such as the amount of the first and second PVOH resins (or the ratio of the first PVOH resin to the second PVOH resin), the amount and type(s) of aldehyde, the delay time before the second PVOH is added to the reaction mixture, and the reaction time can be controlled to produce a resin having a high dispersity in the resin composition, such as a high dispersity in the amounts of residual hydroxyl groups or residual vinyl acetate groups, or in both residual hydroxyl groups and residual acetate groups. The end result will be a mixture or blend of two resins of different composition, one having a higher residual hydroxyl level and/or residual acetate level, and one having a lower residual hydroxyl level and/or residual acetate level to form a composition having a high dispersity.

A polymer having a narrow distribution or low dispersity in composition can have a narrower glass transition, while a polymer having a broad distribution or high dispersity in composition can have a broader glass transition. By formulating the soft layer in the multiple layer interlayer to have a broad distribution or high dispersity in composition, it has been found that the multiple layer glass panels comprising these multiple layer interlayers have better sound insulation properties over a broad temperature range than multiple layer glass panels having a soft layer resin composition having a low dispersity or narrow distribution.

The inventors have surprisingly discovered that the sound insulation property of a multiple layer glass panel can be maintained over a broad temperature range by incorporating a soft layer having a resin that has a broad distribution or high dispersity in composition, and in some cases, more than one glass transition into a glass panel. By formulating the soft layer in the multiple layer interlayer to have a broad distribution or high dispersity (i.e., at least 0.40) in composition, and in some cases, more than one glass transition, as further described herein, the sound insulation property of multiple layer glass panels comprising the improved multiple layer interlayer can be improved compared to glass panels comprising conventional multilayer interlayers having a soft layer(s) with only a single glass transition temperature and/or a resin composition having a narrow distribution or low dispersity in composition (i.e., less than 0.40).

Further, because embodiments of the present invention having three or more polymer layers (i.e., a tri-layer interlayer) can be formulated to be easily handled and can be used as a direct replacement for conventional interlayers in conventional processes, these improved interlayers will be usable in many applications without requiring any modification to the current laminate manufacturing methods. For example, automotive windshields comprising a conventional polymer interlayer can be replaced with an interlayer of the present invention without altering the lamination process used to form the finished windshield.

In various embodiments of the present invention, a multiple layer interlayer comprises at least two polymer layers disposed in contact with each other, wherein one polymer layer is soft and the other polymer layer is stiff, and wherein each polymer layer comprises at least one thermoplastic polymer resin. The thermoplastic polymer can be the same or different in each layer.

Multiple layer glass panels having good sound insulation properties over a broad temperature range can be achieved by formulating the soft layer with a composition having a high dispersity in composition, such as a high dispersity of residual hydroxyl groups and/or residual acetate groups, and/or formulating the soft layer to exhibit multiple glass transition temperatures ($T_g$). The soft layer is then combined with, such as laminated with, one or more stiff layers to form a single, multilayer interlayer by the processes known in the arts, such as co-extrusion or lamination. As described above, the soft layer may comprise a mixture of at least a first resin and a second resin, wherein the soft layer resins, either plasticized or unplasticized, each have a different glass transition and glass transition temperature, wherein the glass transition temperature in the second resin differs from the glass transition temperature in the first resin. Additionally, the glass transition in the second resin may be lower than the glass transition temperature of the stiff layer. Alternatively, or in addition, the soft layer may comprise two or more different resins having different residual hydroxyl contents and/or different residual vinyl acetate contents, or the soft layer resin composition may be produced or obtained by a method, as previously described, to provide a resin composition having a broad distribution and high dispersity in composition (of at least 0.40).

As used herein, the glass transition of a polymer is the state from the "glassy" state into the rubbery state, which is reversible; the glass transition temperature is the temperature that marks the transition from the glassy state to the rubbery state. At the glass transition state, the polymer provides highest acoustic damping. The glass transition temperature ($T_g$) can be determined by dynamic mechanical thermal analysis (DMTA). The DMTA measures the storage (elastic) modulus (G') in Pascals, loss (viscous) modulus (G") in Pascals, tan delta (=G"/G') of the specimen as a function of temperature at a given frequency, and temperature sweep rate. A frequency of 1 Hz and temperature sweep rate of 3° C./min were used. The $T_g$ is then determined by the position of the tan delta peak on the temperature scale in ° C.

In various embodiments of present invention, at least one of the polymer layers comprises a poly(vinyl acetal) resin, such as poly(vinyl butyral), and a plasticizer. In other embodiments, all polymer layers comprise poly(vinyl acetal) resins or poly(vinyl butyral) resins and plasticizers. In embodiments, the resin(s) in the layers are selected to have different dispersities in composition or distributions, as discussed herein.

In various embodiments, where there is a mix of two or more resins in a layer such as the soft layer, the first polymer resin in the softer layer is selected, when plasticized, to have a glass transition temperature, $T_{g1}$, and provide a sound insulation property at an application temperature T1, and the second polymer resin is selected to have a different residual hydroxyl content and a second glass transition temperature, $T_{g2}$ that provides a sound insulation property at second application temperature T2. Additional resins having different residual hydroxyl contents than the first and the second resins can also be selected and have glass transition temperatures $T_{g3}$, $T_{g4}$, . . . $T_{gn}$ (where n is the number of different resins), and incorporated into the layer to provide sound insulation properties at application temperatures T3, T4, . . . Tn (where n is the number of different resins), resulting in the soft layer having multiple glass transitions and exhibiting multiple glass transition temperatures $T_{g1}$, $T_{g2}$, $T_{g3}$, $T_{g4}$, . . . $T_{gn}$, and providing sound insulation properties over a broader temperature range. In some embodiments, multiple $T_g$'s might not be measurable as they may only differ slightly, but the glass transition or $T_g$ may be broader than in a resin composition having a single glass transition. In other embodiments, the resin may have a high dispersity in composition which may also provide multiple or broader glass transitions and $T_g$'s.

In various embodiments, the soft layer comprises a resin composition having a high dispersity in composition, and in some embodiments, the resin composition comprises two poly(vinyl butyral) resins and a plasticizer. The second plasticized resin has a glass transition temperature which differs by at least about 1.5° C. from that of the first plasticized resin, or at least about 2° C., or at least 2.5° C., or at least 3° C., or at least 4° C., or at least 5° C., or at least 6° C., or at least 7° C., or at least 8° C., or at least 9° C., or at least 10° C., or at least 11° C., or by at least 12° C. or more. The first plasticized resin can have a glass transition temperature from −40° C. to about 25° C., or about −30° C. to 20° C., or about −20° C. to 10° C., or about 25° C. or less, or about 20° C. or less, or about 15° C. or less, or about 10° C. or less, or about 9° C. or less, or about 8° C. or less, or greater than about −40° C., or greater than about −35° C., or greater than about −30° C., or greater than about −25° C., or greater than about −20° C. As used herein, the glass transition temperature of the plasticized resin is determined on the sheet formed by the individual plasticized resin, e.g., prior to mixing with another plasticized resin to form, for example, a soft layer.

In various embodiments, the soft layer comprises more than two poly(vinyl butyral) resins and a plasticizer. The glass transition temperatures, $T_{g1}$, $T_{g2}$, $T_{g3}$, . . . correspond to each of the plasticized resins and the difference in glass transition temperatures of two adjacent plasticized resins is at least 1.5° C., or at least 1.6° C., or at least 1.7° C., or at least 1.8° C., or at least 1.9° C., or at least 2.0° C., or at least 2.1° C., or at least 2.2° C., or at least 2.3° C., or at least 2.4° C., or at least 2.5° C., or at least 2.6° C., or at least 2.7° C., or at least 2.8° C., or at least 2.9° C., or at least 3.0° C., or at least 4.0° C., or at least 5.0° C. or more.

The differences in glass transition temperature between the first plasticized resin and the second plasticized resin can be achieved by the methods previously described. In various embodiments, the second PVB resin in the soft layer has a residual hydroxyl content that differs by at least about 1.0 wt. % from the residual hydroxyl content of the first PVB resin, or at least about 1.5 wt. %, or at least about 2.0 wt. %, or at least about 2.5 wt. %, or at least about 3.0 wt. %, or at least about 3.5 wt. %, or at least about 4.0 wt. %, or at least about 4.5 wt. %, or at least about 5.0 wt. %, or at least about 5.5 wt. %, or at least about 6.0 wt. %, or at least about 6.5 wt. %, or at least about 7.0 wt. %, or at least about 7.5 wt. %, or at least about 8.0 wt. %, or at least about 8.5 wt. %, or at least about 9.0 wt. %, or at least about 9.5 wt. %, or at least about 10.0 wt. %, or at least about 10.5 wt. %, or at least about 11.0 wt. %, or at least about 11.5 wt. %, or at least about 12 wt. % or more. For example, in some embodiments, the residual hydroxyl content in the second resin differs from the first resin by about 1.0 wt. % to about 7.0 wt. %. This difference between the first resin and the second resin is calculated by subtracting the residual hydroxyl content of the first resin with the lower residual hydroxyl content from the residual hydroxyl content of the second resin with the greater residual hydroxyl content (or taking the absolute value of the residual hydroxyl content differences). For example, if a first resin has a residual hydroxyl content of 12 wt. %, and a second polymer sheet has a residual hydroxyl content of 15 wt. %, then the residual hydroxyl content of the two resins differs by 3 wt. %, or the residual hydroxyl content in the second resin is 3 wt. % higher than the residual hydroxyl content in the second resin. The difference in the residual hydroxyl content between the first resin and the second is controlled to impart enhanced sound insulation performance to the interlayer, as discussed in fully details in the Examples.

The differences in glass transition temperature between the first plasticized resin and the second plasticized resin can also be achieved by selecting the two resins such that they have the same or similar residual hydroxyl content but different levels of residual vinyl acetate groups or vinyl acetal group content. In this case, the soft layer comprises a resin having a higher dispersity of acetate groups. In various embodiments, the second PVB resin in the soft layer has a residual hydroxyl content that is the same as or similar to the residual hydroxyl content of the first resin but has a the residual vinyl acetate content that differs from the residual vinyl acetate content of the first PVB resin by at least about 2.0 mole %, or at least about 3.0 mole %, or at least about 4.0 mole %, or at least about 5.0 mole %, or at least about 6.0 mole %, or at least about 7.0 mole %, or at least about 8.0 mole %, or at least about 9.0 mole %, or at least about 10.0 mole %, or at least about 11.0 mole %, or at least about 12.0 mole %, or at least about 13.0 mole %, or at least about 14.0 mole %, or at least about 15.0 mole % or more. In other embodiments, the second PVB resin in the soft layer has a residual hydroxyl content and a residual vinyl acetate content that are both different from the first PVB resin. Stated differently, in embodiments, the soft layer comprises at least a first resin having a first residual hydroxyl level and a first residual acetate level, and a second resin having a second residual hydroxyl level and a second residual acetate level, wherein the difference between the residual hydroxyl levels of at least two of the resins is at least 1.0 wt. % and/or the difference between the residual acetate levels of at least two of the resins is at least 2.0 mole %.

In embodiments, any of the PVB resins may have vinyl isobutyral groups, vinyl butyral groups, 2-ethylhexanal groups, or any combination of vinyl butyral, vinyl isobutyral, or 2-ethylhexanal groups.

In various embodiments of the present invention, the residual hydroxyl content of the resin (or at least one of the resins if there are two or more resins) in the soft layer and the residual hydroxyl content in the adjacent stiff layer can differ by at least about 2.5 wt. %, or at least about 3.0 wt. %, or at least about 3.5 wt. %, or at least about 4.0 wt. %, or at least about 4.5 wt. %, or at least about 5.0 wt. %, or at least about 5.5 wt. %, or at least about 6.0 wt. %, or at least about 6.5 wt. %, or at least about 7.0 wt. %, or at least about 7.5 wt. %, or at least about 8.0 wt. %, or at least about 8.5 wt. %, or at least about 9.0 wt. %, or at least about 9.5 wt. %, or at least about 10.0 wt. %, or at least about 10.5 wt. %, or at least about 11.0 wt. %, or at least about 11.5 wt. %, or at least about 12 wt. % or more. In some embodiments, the residual hydroxyl content in the second resin in the soft layer (if present) is greater than that of the first resin in the soft layer and lower than the residual hydroxyl content of the resin in the stiff layer. In further embodiments, where there are at least two resins in the soft layer, the residual hydroxyl content in the second resin in the soft layer is lower than that of the first resin. In exemplary embodiments, the higher residual hydroxyl content of the resin(s) in the soft layer is less than the residual hydroxyl content of the resin in the stiff layer and differs by at least 2.5 wt %, or at least about 3.0 wt. %, or at least about 3.5 wt. %, or at least about 4.0 wt. %, or at least about 4.5 wt. %, or at least about 5.0 wt. %, or at least about 5.5 wt. %, or at least about 6.0 wt. %, or at least about 6.5 wt. %, or at least about 7.0 wt. %, or at least about 7.5 wt. %, or at least about 8.0 wt. %, or at least about 8.5 wt. %, or at least about 9.0 wt. %, or at least about 9.5 wt. %, or at least about 10.0 wt. %, or at least about 10.5 wt. %, or at least about 11.0 wt. %, or at least about 11.5 wt. %, or at least about 12 wt. % or more. In other embodiments having two or more resins, the residual hydroxyl content of the resin in the skin layer is the same as the residual hydroxyl content of one of the resins in the soft layer. Any combination of residual hydroxyl levels may be possible as known to one skilled in the art and as necessary to provide an interlayer having the desired properties.

In various embodiments of the present invention, the residual hydroxyl content of the resin(s) in the soft layer and the residual hydroxyl content of the resin(s) in the adjacent stiff layer(s) can be the same or different, and the residual hydroxyl content of the resin(s) in the soft layer can be higher or lower than the residual hydroxyl content of the resin(s) in the adjacent stiff layer(s), as desired.

In various embodiments of the present invention, the residual acetate content of the resin(s) in the soft layer and the residual acetate content in of the resin(s) in the adjacent stiff layer(s) can be the same or different, and the residual acetate content of the resin(s) in the soft layer can be higher or lower than the residual acetate content in of the resin(s) in the adjacent stiff layer(s), as desired.

FIG. 1 shows the distribution or dispersity of hydroxyl groups for a Disclosed Resin (DR-1, the resin used in Disclosed Layers DL-1 to DL-4) and a Comparative Resin (CR-1, the resin used in Comparative Layer CL-1). The Disclosed Resin (DR-1), which is a blend of two resins having different residual hydroxyl contents, has a broader distribution, and therefore a higher dispersity in composition (0.41), and has a broader $T_g$, than the Comparative Resin (CR-1), which has a lower dispersity (0.31).

Figure 2:
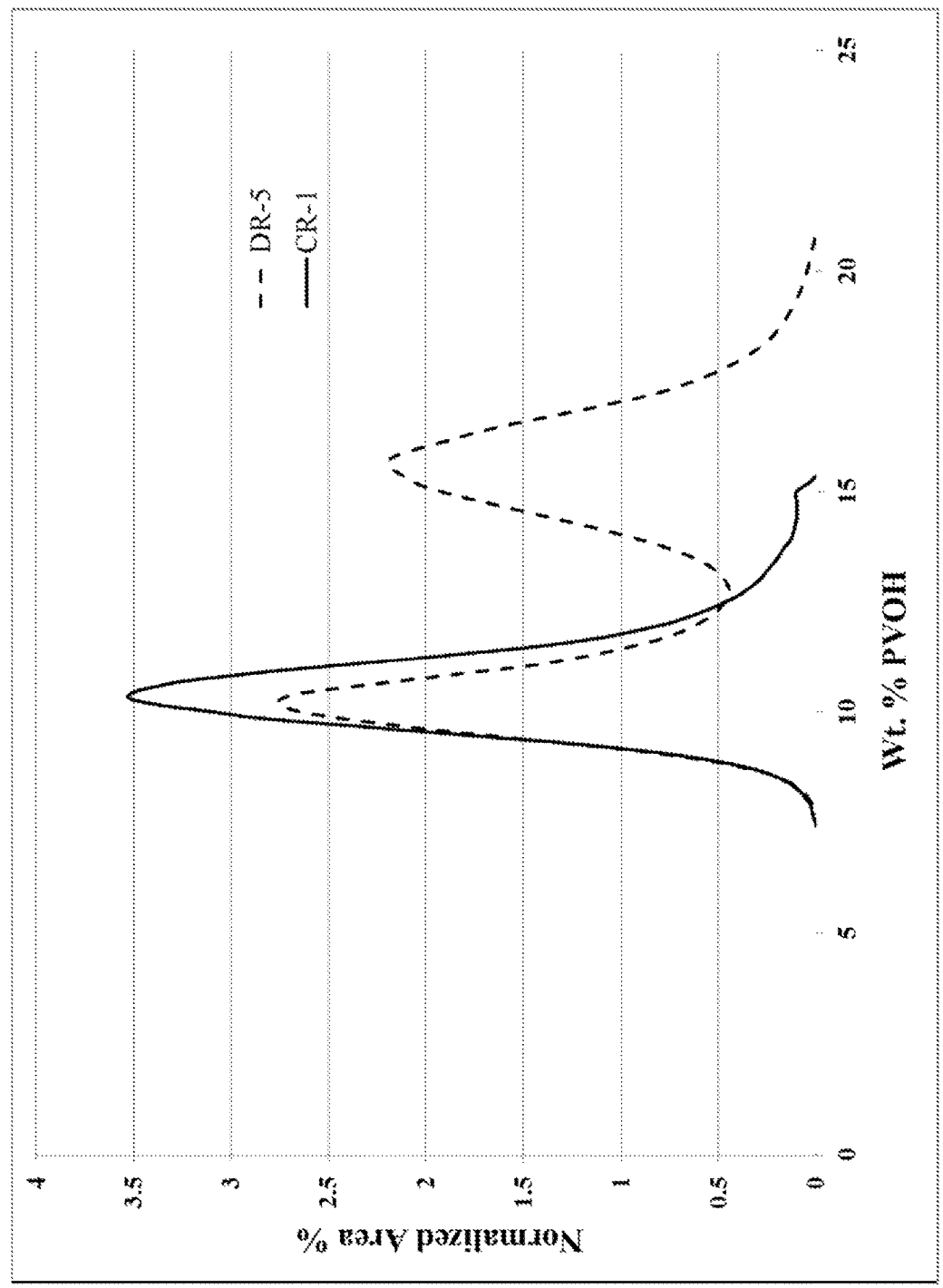
FIG. 2 is a chart showing the distribution of a resin composition for a disclosed core layer resin (DR-5) and a comparative core layer resin (CR-1).

FIG. 2 shows the distribution or dispersity of hydroxyl groups for a different Disclosed Resin (DR-5, the resin used in Disclosed Layers DL-9 and DL-10) and a Comparative Resin (CR-1, the resin used in Comparative Layer CL-1). The Disclosed Resin (DR-5), which is another blend of two resins having different residual hydroxyl contents having a larger difference between the residual hydroxyl contents than the resins in Disclosed Resin DR-1, which has a dispersity in composition of 0.41, has a broader distribution and two peaks and two glass transitions and $T_g$ values, and therefore a higher dispersity in composition (0.72), than the Comparative Resin (CR-1), which has a lower dispersity (0.31).

FIGS. 1 and 2, as well as the data in the Examples and Tables below, illustrate that by formulating the Disclosed Resin composition used in the core layer from a blend of two different resins having different hydroxyl contents, the Disclosed Resin compositions have a broader distribution and higher dispersity in composition than the Comparative Resins.

Figure 3:
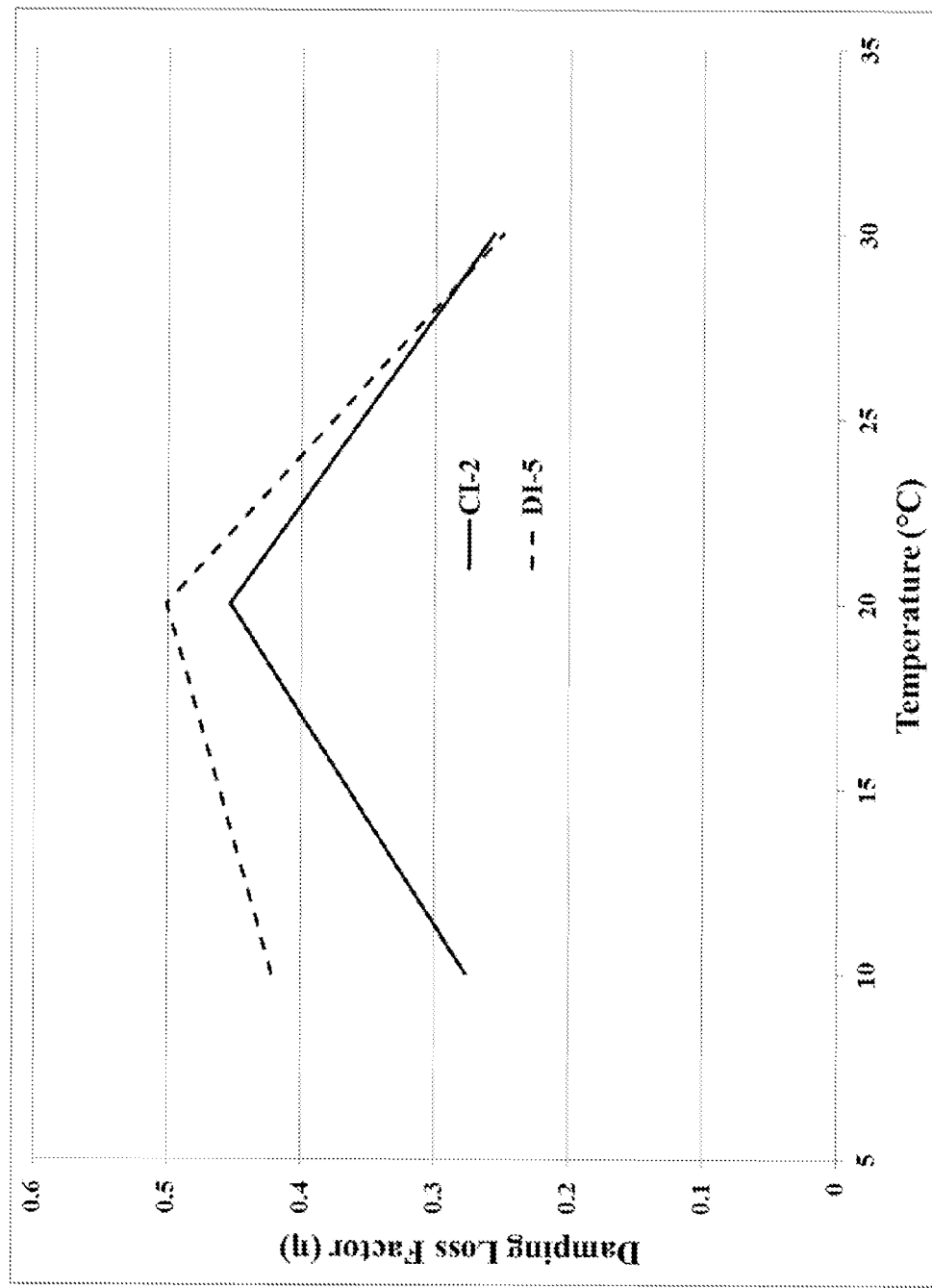
FIG. 3 is a chart showing the damping loss factor at 10° C., 20° C., and 30° C. for a disclosed interlayer (DI-5) and a comparative interlayer (CI-2).

FIG. 3 shows the damping loss factor at 10° C., 20° C. and 30° C. for a Disclosed Interlayer (DI-5) and a Comparative Interlayer (CI-2). The Disclosed Interlayer (DI-5) has a core layer containing a 50:50 blend of two resins: a first resin having a residual hydroxyl content of about 9.6 wt. % and a second resin having a residual hydroxyl content of about 11.5 wt. % (wherein the blend has an average residual hydroxyl of about 10.5 wt. %), and contains 75 phr plasticizer. The core layer resin (DR-1) has a dispersity in composition of 0.41. The Comparative Interlayer (CI-2) has a core layer containing a single Comparative Resin (CR-1) having a residual hydroxyl content of about 10.5 wt. % and dispersity in composition of 0.31, and contains 75 phr plasticizer (the same levels as DI-5). Both interlayers have a core layer thickness of 10 mils and a total interlayer thickness of 40 mils, and the average residual hydroxyl content and amount of plasticizer in the core layers are the same. The Disclosed Interlayer (DI-5) comprising a blend of two resins (DR-1), shows improved damping loss factor at both 10° C. and 20° C. while maintaining the damping loss factor at 30° C. (essentially unchanged compared to the Comparative Interlayer, CI-2), thus providing better or improved sound insulation over a broader range of temperatures (i.e., from 10° C. to 20° C. to 30° C.), and particularly at lower temperatures compared to Comparative Interlayer CI-2.

Figure 4:
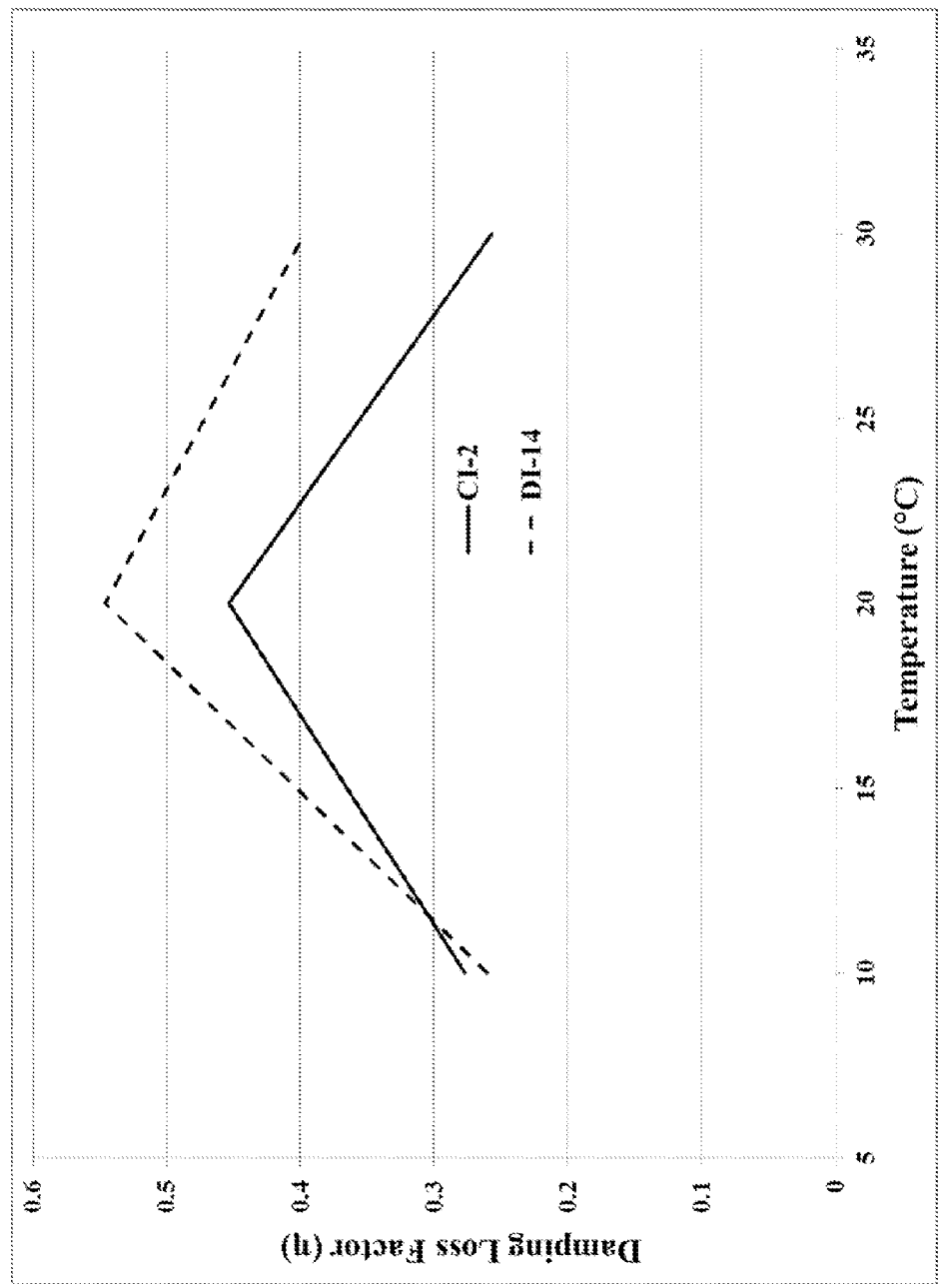
FIG. 4 is a chart showing the damping loss factor at 10° C., 20° C., and 30° C. for a disclosed interlayer (DI-14) and a comparative interlayer (CI-2).

FIG. 4 shows the damping loss factor at 10° C., 20° C. and 30° C. for a Disclosed Interlayer (DI-14) and a Comparative Interlayer (CI-2). The Disclosed Interlayer (DI-14) has a core layer resin containing a 50:50 blend of two resins (DR-3): a first resin having a residual hydroxyl content of about 9.6 wt. % and a second resin having a residual hydroxyl content of about 13 wt. % (where the blend has an average residual hydroxyl of about 11.3 wt. %), and contains 70 phr plasticizer. The core layer resin (DR-3) has a dispersity in composition of 0.68. The Comparative Interlayer (CI-2) has a core layer containing a single resin (CR-1) having a residual hydroxyl content of about 10.5 wt. % and a dispersity in composition of 0.31, and contains 75 phr plasticizer. Both interlayers have a core layer thickness of 10 mils and a total interlayer thickness of 40 mils. The Disclosed Interlayer (DI-14) comprising a blend of two resins (DR-3, as described herein) shows improved damping loss factor at both 20° C. and 30° C. while maintaining the damping loss factor at 10° C. (essentially unchanged compared to the Comparative Interlayer, CI-2), thus providing sound insulation over a broader range of temperatures, and particularly at higher temperatures, than the Comparative Interlayer, CI-2.

Figure 5:
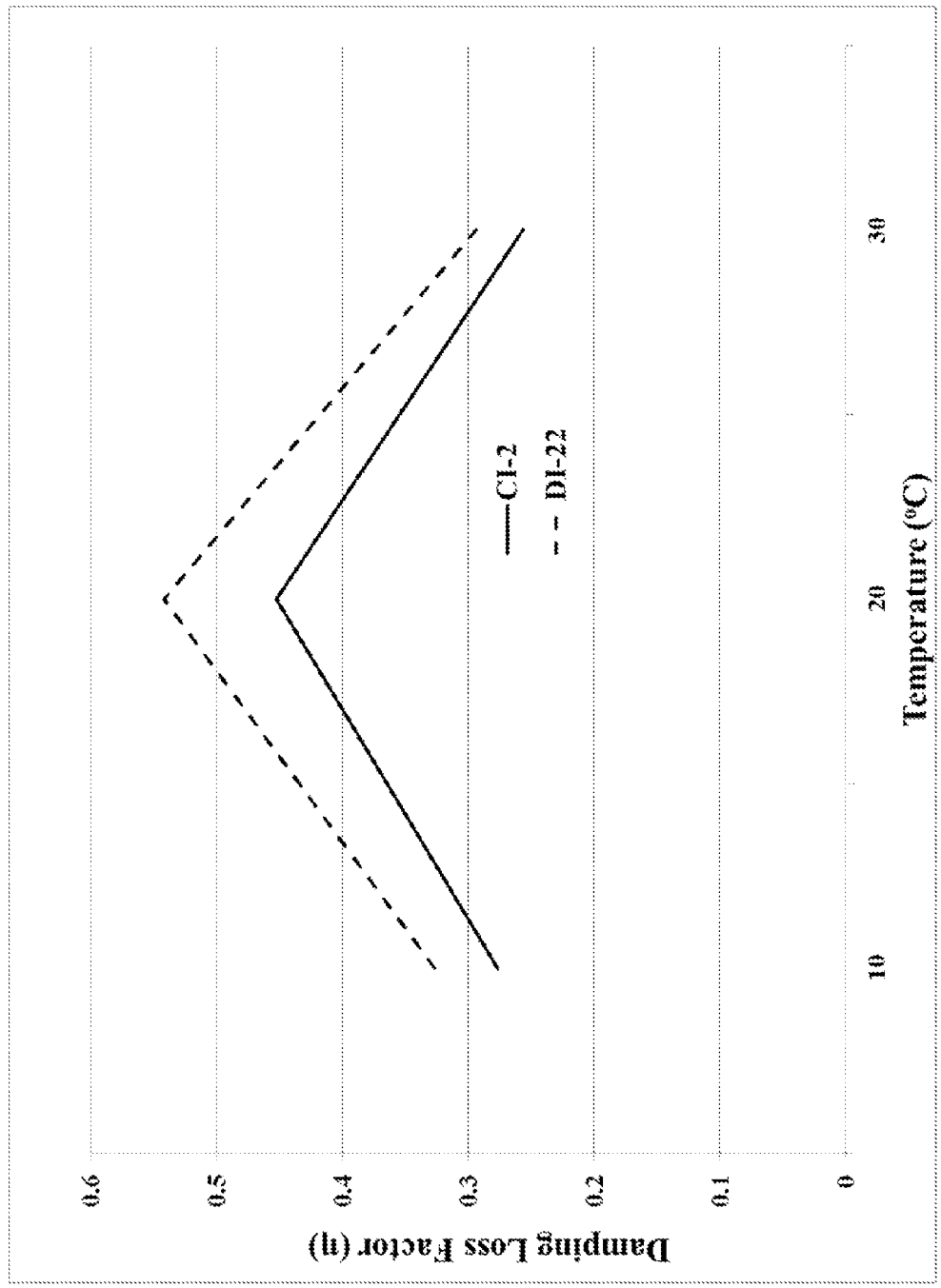
FIG. 5 is a chart showing the damping loss factor at 10° C., 20° C., and 30° C. for a disclosed interlayer (DI-22) and a comparative interlayer (CI-2).

FIG. 5 shows the damping loss factor at 10° C., 20° C. and 30° C. for a Disclosed Interlayer (DI-22) and a Comparative Interlayer (CI-2). The Disclosed Interlayer has a core layer resin (DR-2) containing a 75:25 blend of two resins: a first resin having a residual hydroxyl content of about 9.6 wt. % and a second resin having a residual hydroxyl content of about 13 wt. % (where the blend has an average residual hydroxyl of about 10.5 wt. %), and contains 70 phr plasticizer. The core layer resin (DR-2) has a dispersity in composition of 0.58. The Comparative Interlayer has a core layer containing a single resin (CR-1) having a residual hydroxyl content of about 10.5 wt. % and a dispersity in composition of 0.31, and contains 75 phr plasticizer. Both interlayers have a core layer thickness of 10 mils and a total interlayer thickness of 40 mils. The Disclosed Interlayer (DI-22) comprising a blend of two resins (DR-2) shows improved damping loss factor at all three temperatures, thus providing sound insulation over a broader range of temperatures.

FIGS. 3 to 5 illustrate that by formulating the soft layer (in this case, the core layer) in a multiple layer interlayer to contain a resin composition having a high dispersity in composition (broad distribution), such as one comprising a blend of two (or more) resins, the sound insulation can be improved at lower temperatures, higher temperatures, or over a broader range of temperatures. To broaden the sound insulation performance over the temperature range of interest, the dispersity in composition is controlled to be at least 0.40 (i.e., high dispersity in composition).

For example, in one embodiment, this broad distribution or high dispersity in composition is controlled and achieved by selecting resins and/or starting materials (such as PVOH resins) where the difference in the residual hydroxyl content of the resins or starting materials is more than about 3 wt. %. In another embodiment, to broaden the performance on only one side of the temperature range, the difference in the residual hydroxyl content might be selected to be less than about 3 wt. %. This dispersity in composition, which is influenced by the difference in the resins or starting materials (such as the difference in the residual hydroxyl contents) is also selected to affect the application temperature of glass panels comprising the interlayers of present disclosure. In another embodiment, this broad distribution or high dispersity in composition is controlled and achieved by selecting resins and/or starting materials (such as PVOH resin) where the difference in the residual acetate content of the resins or starting materials is more than about 5 mole %. In other embodiments, to broaden the performance on only one side of the temperature range, the difference in the residual acetate content might be selected to be less than about 5 mole %.

In various embodiments, the PVB resin in the soft layer comprises about 6 to about 22 weight percent (wt. %) hydroxyl groups calculated as % PVOH, about 8 to about 16 wt. %, about 10 to about 14 wt. %, and for certain embodiments, about 8 to about 12 wt. % hydroxyl groups calculated as % PVOH. In various embodiment, the resin can also comprise less than 30 wt. % residual ester groups, less than 25 wt. % residual ester groups, less than 20 wt. %, less than 15 wt. %, less than 13 wt. %, less than 10 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde acetal group, or a 2-ethyl hexanal acetal group, or a mix of any two of butyraldehyde acetal, isobutyraldehyde, and 2-ethyl hexanal acetal groups.

In various embodiments, where the resin comprises a blend of two (or more) resins, the second resin comprises about 6 to about 24 wt. %, about 7 to about 18 wt. %, about 8 to about 16 wt. %, and for certain embodiments, about 10 to about 14 wt. % hydroxyl groups calculated as % PVOH. In various embodiments, the resin can also comprise less than about 30 wt. % residual ester groups, less than 25 wt. % residual ester groups, less than 20 wt. %, less than 15 wt. %, less than 13 wt. %, less than 10 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde acetal group, or a 2-ethyl hexanal acetal group, or a mix of any two of butyraldehyde acetal, isobutyraldehyde, and 2-ethyl hexanal acetal groups.

In various embodiments, the resin in the stiff layer can comprise about 15 to about 35 wt. %, about 16 to about 30 wt. %, or about 17 to about 22 wt. %; and, for certain embodiments, about 17.5 to about 22.5 wt. % residual hydroxyl groups calculated as % PVOH. In various embodiments, the first resin and the second resin for the soft layer, or the resin for the stiff layer(s), or any two of these resins, or all of the resins can also comprise less than 30 wt. % residual ester groups, less than 25 wt. % residual ester groups, less than 20 wt. %, less than 15 wt. %, less than 13 wt. %, less than 10 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde, a 2-ethyl hexanal acetal group, or a mix of any two of butyraldehyde acetal, isobutyraldehyde acetal group, and 2-ethyl hexanal acetal groups, as previously discussed.

In embodiments, the resin(s) in the soft layer comprises from about 1 mole % to less than 30 mole % residual ester content, such as residual acetate content, or less than about 29 mole %, or less than about 28 mole %, or less than about 27 mole %, or less than about 26 mole %, or less than about 25 mole %, or greater than about 1 mole %, or greater than about 2 mole %, or more.

In embodiments comprising a blend of two resins, the amount of the second resin relative to the first resin can vary in any range, as desired, such as from 1 to 99 wt. %, 2 to 98 wt. %, 3 to 97 wt. %, 4 to 96 wt. %, 5 to 95 wt. %, 10 to 90 wt. %, 15 to 85 wt. %, 20 to 80 wt. %, 25 to 75 wt. %, or about 50 wt. % of each in the soft layer. The amount of the second resin may be any amount, from about 1 wt. % up to about 99 wt. %, depending on the desired properties. In certain embodiments, the amount of the second resin varies from about 25 to about 75 wt. %.

In various embodiments, the soft layer comprises more than two resins. The differences in composition between any two of the resins can be any of the differences given above for the differences between the first resin and the second resin. For more than two resins, each resin can be included in amounts of at least 1 wt. % or more, or at least 2 wt. %, or at least 3 wt. %, or at least 4 wt. %, or at least 5 wt. % up to 98 wt %, depending on the desired properties of the polymer interlayer and the specific properties of the resins. In other embodiments, the soft layer comprises one resin produced to have a broad distribution and high dispersity in composition (of at least 0.40), as previously described.

In multilayer interlayers of the invention, resins are generally plasticized, depending on the specific resin selected. For a given type of plasticizer, the compatibility of that plasticizer in a poly(vinyl butyral) resin is largely determined by the hydroxyl content. Typically, poly(vinyl butyral) with a greater residual hydroxyl content will result in a reduced plasticizer compatibility or capacity. Likewise, poly(vinyl butyral) with a lower residual hydroxyl content will result in an increased plasticizer compatibility or capacity. These properties can be used to select the hydroxyl content of each poly(vinyl butyral) polymer, fabricate the soft layer to have a broad glass transition, and formulate each of the polymer sheet layers to allow for the proper plasticizer loading and to stably maintain the differences in plasticizer content between the polymer layers and between the two or more resins in the soft layer.

The amount of plasticizer in the interlayer can be adjusted to affect the glass transition temperature ($T_g$). In general, higher amounts of plasticizer loading will result in lower $T_g$. Because the plasticizer will partition such that there is more plasticizer in the polymer resin having the lower residual hydroxyl content and less plasticizer in the PVB resin having the higher residual hydroxyl content, the amount of plasticizer can be adjusted to shift the glass transition of the soft layer and the temperature at which the interlayer exhibits optimum sound insulation property.

In various embodiments of present disclosure, the interlayer comprises greater than 5 phr, about 5 to about 120 phr, about 10 to about 90 phr, about 20 to about 70 phr, about 30 to about 60 phr, or less than 120 phr, or less than 90 phr, or less than 60 phr, or less than 40 phr, or less than 30 phr total plasticizer. The total plasticizer content in the interlayer is adjusted to affect the glass transitions of the soft layer to optimize sound insulation property of the interlayer at a given application temperature range. The plasticizer content in the stiff layer(s) or soft layer(s) can be different from the total plasticizer content. In addition, the stiff layer(s) and soft layer(s) can have different plasticizer types and plasticizer contents, in the ranges discussed above, and as each respective layer's plasticizer content at the equilibrium state is determined by the layer's respective residual hydroxyl contents, as disclosed in U.S. Pat. No. 7,510,771 (the entire disclosure of which is incorporated herein by reference). For example, at equilibrium the interlayer could comprise two stiff outer (skin) layers, each with 30 phr plasticizer, and a soft inner (core) layer with 65 phr plasticizer, for a total plasticizer amount for the interlayer of about 45.4 phr when the combined stiff layer thickness equals that of the soft layer. For thicker or thinner stiff layers, the total plasticizer amount for the interlayer would change accordingly. In various embodiments of the present invention, the plasticizer content of the soft layer and stiff layer differs by at least 8 phr, or at least 9 phr, or at least 10 phr, or at least 12 phr, or at least 13 phr, or at least 14 phr, or at least 15 phr, or at least 16 phr, or at least 17 phr, or at least 18 phr, or at least 19 phr, or at least 20 phr, or at least 25 phr or more. As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the mix or melt that was used to produce the interlayer.

In various embodiments, the plasticizer is selected from conventional plasticizers or a mixture of two or more conventional plasticizers. In some embodiments, the conventional plasticizer, which has refractive index of less than about 1.450, may include, for example, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, dibutyl sebacate, dioctyl sebacate, di(butoxyethyl) adipate, bis(2-(2-butoxyethoxy)ethyl) adipate, and mixtures thereof. In some embodiments, the conventional plasticizer is 3GEH (Refractive index=1.442 at 25° C.).

In some embodiments, other plasticizers known to one skilled in the art may be used, such as a plasticizer with a higher refractive index (i.e., a high refractive index plasticizer). As used herein, a "high refractive index plasticizer" is a plasticizer having a refractive index of at least about 1.460. As used herein, the refractive index (also known as index of refraction) of a plasticizer or a resin used in the entirety of this disclosure is either measured in accordance with ASTM D542 at a wavelength of 589 nm and 25° C. or reported in literature in accordance with ASTM D542. In various embodiments, the refractive index of the plasticizer is at least about 1.460, or greater than about 1.470, or greater than about 1.480, or greater than about 1.490, or greater than about 1.500, or greater than 1.510, or greater than 1.520, for both core and skin layers. In some embodiments, the high refractive index plasticizer(s) is used in conjunction with a conventional plasticizer, and in some embodiments, if included, the conventional plasticizer is 3GEH, and the refractive index of the plasticizer mixture is at least 1.460.

Examples of plasticizers having a high refractive index that may be used include, but are not limited to, polyadipates (RI of about 1.460 to about 1.485); epoxides (RI of about 1.460 to about 1.480); phthalates and terephthalates (RI of about 1.480 to about 1.540); benzoates (RI of about 1.480 to about 1.550); and other specialty plasticizers (RI of about 1.490 to about 1.520). Examples of the high refractive index plasticizer include, but are not limited to, esters of a polybasic acid or a polyhydric alcohol, polyadipates, epoxides, phthalates, terephthalates, benzoates, toluates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexanonate), ethoxylated nonylphenol, and mixtures thereof.

In embodiments, a mixture of plasticizers may be used in one or more layers, such as a mixture of two or more conventional plasticizers, two or more high refractive index plasticizers, or a mixture of at least one high refractive index plasticizer and at least one conventional plasticizer having a lower refractive index. One skilled in the art would understand how to select the plasticizer(s) to obtain the desired results and refractive index of the layer(s) and interlayer.

In embodiments having more than two layers, the polymer interlayer may comprise a second, or an additional stiff layer (such as a second skin layer) that is disposed in contact with the soft layer having the higher plasticizer content. Addition of this polymer layer results in a three layer construct that has the following structure: first stiff layer// soft layer//second stiff layer, which may also be described, as: first skin layer//core layer//second skin layer. This second stiff or skin layer can have the same composition as the first stiff or skin layer, or it can be different. Additional layers may also be present as desired.

In various embodiments, the second stiff layer has the same composition as the first stiff layer. In other embodiments, the second stiff layer has a different composition than the first stiff layer, and the differences in composition between the second stiff layer and the soft layer can be any of the differences given above for the differences between the first stiff layer and the soft layer. For example, one embodiment could be: first stiff layer with a residual hydroxyl content of 20 wt. %//soft layer with first resin having a residual hydroxyl content of 15.5 wt. % and second resin having a residual hydroxyl content of 17 wt. %//second stiff layer with a residual hydroxyl content of 18 wt. %. It will be noted that, in this example, the stiff layer differs from the first resin in the soft layer at least in that it has a residual hydroxyl content that is 2.5 wt. % greater than the hydroxyl content of the first resin. Of course, any of the other differences noted herein throughout can singly or in combination distinguish the second stiff layer from the soft layer. This is just one example and one skilled in the art would recognize that many other embodiments and combinations are possible and contemplated herein.

In addition to the two or three layer embodiments described herein, further embodiments include interlayers having more than three layers in which further layers having different residual hydroxyl layers can be used, for example, iterations of polymer layers having alternating plasticizer contents with alternating hydroxyl contents and optionally residual acetate content of about 1 to about 30 mole %. Interlayers formed in such a manner can have, for example, 4, 5, 6, or up to 10 or more individual layers.

Generally, the thickness, or gauge, of the polymer interlayer will be in a range from about 0.25 mm to about 2.54 mm (about 10 mils to 100 mils), about 0.38 mm to about 1.52 mm (about 15 mils to 60 mils), about 0.51 to 1.27 mm (about 20 mils to about 50 mils), and about 0.38 to about 0.89 mm (about 15 mils to about 35 mils), although interlayers that are thinner or thicker are contemplated and may also be used if desired. In various embodiments, each of the layers, such as the stiff and soft (or skin and core, in some embodiments) layers, of the multilayer interlayer may have a thickness of about 1 mil to 99 mils (about 0.025 to 2.51 mm), about 1 mil to 59 mils (about 0.025 to 1.50 mm), 1 mil to about 29 mils (about 0.025 to 0.74 mm), or about 2 mils to about 28 mils (about 0.05 to 0.71 mm), although any combination of thicknesses is possible.

The final interlayer, whether formed from extrusion or co-extrusion, generally has a random rough surface topography as it is formed through melt fractures of polymer melt as it exits the extrusion die, and it may additionally be embossed over the random rough surface on one or both sides (e.g., the outer or skin layers) by any method of embossment known to one of ordinary skill in the art, if desired.

The sound insulation effect over a broad temperature range that is characteristic of the multilayer interlayers disclosed herein is achieved in a single polymer interlayer through the use of co-extrusion processes. For each interlayer embodiment of the present invention in which two or more separate polymer layers are disposed in contact with one another and subsequently laminated into a single interlayer, there also exists an embodiment where a coextruded polymer sheet has two or more distinct layers corresponding to the individual layers in a laminated interlayer of the present invention. Further, for each of the multiple layer glass panels, methods of producing interlayers, and methods of producing multiple layer glass panels of the present invention in which separate polymer layers are laminated together, there is also an analogous embodiment employing a coextruded polymer layers in place of the multiple layer interlayer.

The present invention also includes various methods of producing a resin having a high dispersity in composition, such as a high dispersity in residual hydroxyl levels or a high dispersity in residual acetate levels or both a high dispersity in residual hydroxyl levels and a high dispersity in residual acetate levels, as previously described.

The present invention also includes methods of manufacturing an interlayer, comprising the steps of forming a first polymer layer and a second polymer layer comprising a resin composition having a high dispersity in composition, wherein the two polymer layers have different compositions, as described herein, and laminating the two polymer layers together to form the interlayer.

The present invention also includes methods of manufacturing an interlayer, comprising the steps of forming a first polymer layer, a second polymer layer comprising two or more resins of different compositions, and a third polymer layer, wherein the three polymer layers have compositions according to the three layer embodiments as described herein, and laminating the three polymer layers together to form the interlayer.

The present invention also includes methods of manufacturing an interlayer, comprising the steps of forming a first polymer layer, a second polymer layer comprising a resin of different composition wherein the resin is produced by the process of mixing a first poly(vinyl alcohol) resin and a second poly(vinyl alcohol) resin composition to form a mixture, wherein the first poly(vinyl alcohol) resin and a second poly(vinyl alcohol) resin composition each have a degree of hydrolysis and the difference between the degree of hydrolysis of the first poly(vinyl alcohol) resin and a second poly(vinyl alcohol) resin is at least 2%, wherein the mixture is reacted with butyraldehyde to produce a resin having a dispersity in composition of at least 0.40, and a third polymer layer, wherein the three polymer layers have compositions according to the three layer embodiments as described herein, and laminating the three polymer layers together to form the interlayer.

The present invention also includes methods of manufacturing an interlayer, comprising the steps of forming a first polymer layer, a second polymer layer comprising a resin of different composition wherein the resin is produced by the process of reacting a first poly(vinyl alcohol) resin having a first degree of hydrolysis with a butyraldehyde to form a reaction mixture, adding a second poly(vinyl alcohol) resin with a second degree of hydrolysis to the reaction mixture, and allowing the second poly(vinyl alcohol) resin to react with the butyraldehyde to form a resin having a dispersity in composition of at least 0.40, and a third polymer layer, wherein the three polymer layers have compositions according to the three layer embodiments as described herein, and laminating the three polymer layers together to form the interlayer.

The present invention also includes the interlayers comprising various adhesion control agents ("ACAs"). Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethylhexanoate).

The present invention also includes other additives to impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

The present invention also includes a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)//(polymer interlayer sheet)//(polymer film), where the polymer interlayer sheet can comprise multiple interlayers, as noted above.

The present invention also includes methods of manufacturing a multiple layer glazing, comprising laminating any of the interlayers of the present invention between two rigid, transparent panels, as are known in the art, such as glass or acrylic layers. The present invention also includes multiple layer glass panels, such as windshields and architectural windows, comprising a multilayer interlayer of the present invention. Also included are multiple layer glazing panels having plastics, such as acrylics, or other suitable materials in place of the glass panels. These examples of multiple layer panels are in no way meant to be limiting, as one of ordinary skill in the art would readily recognize that numerous constructs other than those described above could be made with the interlayers of the present disclosure.

The sound insulation property, such as Sound Transmission Loss, of a glass panel comprising interlayer of the present invention is evaluated by the damping loss factor value obtained from vibration measurements. Sound transmission loss of a glass panel correlates with damping loss factor of the panel (see, for example, Lu, J: "Designing PVB Interlayer for Laminated Glass with Enhanced Sound Reduction", 2002, InterNoise 2002, paper 582). The damping loss factor ($\eta$) was measured by Mechanical Impedance Measurement as described in ISO 16940. A laminated glass bar sample of 25 mm wide, 300 mm long, and having a pair of 2.3 mm clear glass is prepared and excited at the center point of the bar by a vibration shaker (Brüel and Kjær). An impedance head (Brüel and Kjær) is used to measure the force to excite the bar to vibrate and the velocity of the vibration and the resultant transfer function is recorded on a National Instrument data acquisition and analysis system. The damping loss factor at the first vibration mode is calculated using the half-power method. Higher damping loss factor means better sound insulation performance.

The dispersity in resin composition for various resin samples was determined by Gradient Polymer Elution Chromatography (GPEC). For poly(vinyl acetal)s such as poly (vinyl butyral), the GPEC method has been used to estimate the distribution of the residual polyvinyl alcohol content (see, for example, Striegel, A. M. *Journal of Chromatography A* 2002 971 151), although other compositional variations can be detected, such as differences in residual polyvinyl acetate content. The GPEC method can be run in normal phase mode or reverse phase mode. For the analysis of the resin compositions of the invention, the GPEC method used was based on a reversed phase HPLC mode. The experimental conditions used were as follows: 1) Thermo Scientific Dionex Ultimate 3000 Series HPLC; 2) Corona Veo Charged Aerosol detector—Evaporator (low setting); 3) Column: Supelco Discovery C18, 150 mm, 4.6 mm, 5 micron, 180A; 4) Column temperature: 30° C.; 5) Injection volume: 10 microliters; and 6) The mobile phase was run under gradient conditions at a flow rate of 1 ml/min as shown in the Table below.

| Conditions | | | |
|---|---|---|---|
| Time (min) | H$_2$O % | MeOH % | Isopropanol % |
| 0 | 80 | 20 | 0 |
| 2 | 80 | 20 | 0 |
| 2.1 | 40 | 20 | 40 |
| 22.1 | 0 | 20 | 80 |
| 35.0 | 0 | 20 | 80 |
| 35.1 | 80 | 20 | 0 |
| 41 | 80 | 20 | 0 |

To prepare the samples, approximately 0.01 to 0.02 grams of the PVB resins were dissolved in 10 milliliters 1-methyl-2-pyrrolidone ("NMP", CAS[872-50-4]). The solutions were left at room temperature to dissolve overnight and then filtered through a 0.22 micron PTFE filter.

A calibration curve was generated from a set of PVB resins of varying PVOH contents at the same PVAc content (less than about 2 mole %). The PVOH concentrations of the calibration resins were determined by near infrared spectroscopy (NIRA). The NIRA-based concentrations were generated from a calibration based on ASTM D-1396. The peak maximum was assumed to be the weight percent PVOH for the calibration (standard) sample. A calibration curve was obtained by plotting the log of the PVOH composition as a function of retention time. The dispersities in composition of the resins were measured on resins having the noted residual hydroxyl levels and are shown in the Tables and Examples below.

Figure 6:
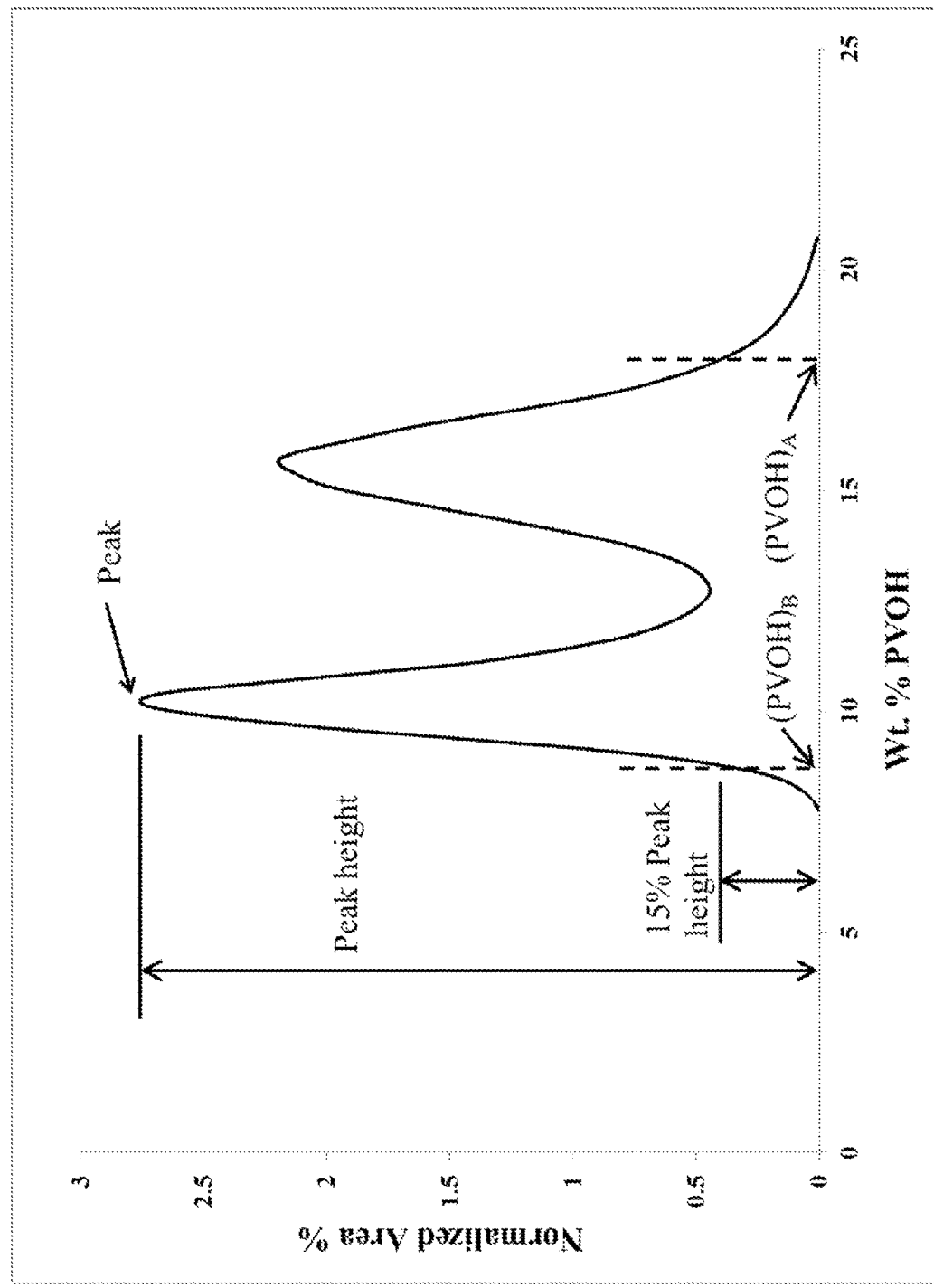
FIG. 6 is a chart illustrating graphically how the 15% peak height is calculated.

Chromatographic software was used to divide the chromatographic peak into 100 area slices. These slices were used to generate weight (mean) PVOH averages (PVOH$_w$). The dispersity in composition was calculated by first determining the difference in calculated PVOH values at the points above and below the peak value that were 15% of the peak height. The dispersity in composition was calculated by dividing this PVOH difference by the weight average (mean) PVOH. For cases where the sample contains multiple peaks, the larger peak was used to determine the 15% peak heights and the PVOH difference included the peaks that were above the 15% peak heights to determine dispersity (as shown in FIG. 6). The formulas used were as follows:

$$PVOH_w = \Sigma A_i (PVOH)_i / \Sigma A_i, i=1 \text{ to } 100 \quad (I)$$

$$Dispersity = [(PVOH)_A - (PVOH)_B] / PVOH_W \quad (II)$$

In the above formulas (I) and (II), $A_i$ is the normalized area of the i$^{th}$ slice and (PVOH)$_A$ and (PVOH)$_B$ are the calculated PVOH compositions at the 15% peak heights above and below the peak maximum.

The invention also includes Embodiments 1 to 16, as set forth below.

Embodiment 1 is a polymer interlayer having improved sound insulation, the polymer interlayer comprising: a stiff layer comprising a poly(vinyl butyral) resin composition and a plasticizer; and a soft layer comprising a poly(vinyl butyral) resin composition and a plasticizer, wherein the soft layer has a dispersity in composition of at least 0.40; and wherein the polymer interlayer has a damping loss factor (η) (as measured by Mechanical Impedance Measurement according to ISO 16940) of at least about 0.15 measured at two or more different temperatures selected from 10° C., 20° C. and 30° C.

Embodiment 2 is a polymer interlayer having improved sound insulation, the polymer interlayer comprising: a stiff layer comprising a poly(vinyl butyral) resin composition and a plasticizer; and a soft layer comprising a poly(vinyl butyral) resin composition, wherein the soft layer comprises a first poly(vinyl butyral) resin having a first dispersity in composition and a second poly(vinyl butyral) resin having a second dispersity in composition, and a plasticizer, wherein the soft layer has a third dispersity in composition and wherein the third dispersity in composition is at least 0.40 and wherein the third dispersity in composition is greater than both the first dispersity in composition and the second dispersity in composition; and wherein the polymer interlayer has a damping loss factor (η) (as measured by Mechanical Impedance Measurement according to ISO 16940) of at least about 0.15 measured at two or more different temperatures selected from 10° C., 20° C. and 30° C.

Embodiment 3 is a polymer interlayer having improved sound insulation, the polymer interlayer comprising: a stiff layer comprising a poly(vinyl butyral) resin composition and a plasticizer; and a soft layer comprising a poly(vinyl butyral) resin composition and a plasticizer, wherein the soft layer resin composition has an average residual hydroxyl content of from about 8 to about 16 weight % and a dispersity in composition of at least 0.40, wherein the polymer interlayer has a damping loss factor (η) (as measured by Mechanical Impedance Measurement according to ISO 16940) of at least about 0.15 measured at two or more different temperatures selected from 10° C., 20° C. and 30° C.

Embodiment 4 is a polymer interlayer including any of the features of embodiments 1 to 3, wherein the poly(vinyl butyral) resin composition in the soft layer comprises a first poly(vinyl butyral) resin having a first residual hydroxyl content and a second poly(vinyl butyral) resin having a second residual hydroxyl content, wherein the difference between the first residual hydroxyl content and the second residual hydroxyl content is at least 1.0 weight percent.

Embodiment 5 is a polymer interlayer including any of the features of embodiments 1 to 4, wherein the dispersity in composition of the resin composition in the soft layer is greater than the dispersity in composition of the first poly(vinyl butyral) resin in the soft layer and the dispersity in composition of the second poly(vinyl butyral) resin in the soft layer.

Embodiment 6 is a polymer interlayer including any of the features of embodiments 1 to 5, wherein the poly(vinyl butyral) resin composition in the soft layer comprises a first poly(vinyl butyral) resin having a first residual vinyl acetate content and a second poly(vinyl butyral) resin having a second residual vinyl acetate content, wherein the difference between the first residual vinyl acetate content and the second residual vinyl acetate content is at least 1.0 mole %.

Embodiment 7 is a polymer interlayer including any of the features of embodiments 1 to 6, wherein the dispersity in composition of the resin composition in the soft layer is greater than the dispersity in composition of the first poly(vinyl butyral) resin in the soft layer and the dispersity in composition of the second poly(vinyl butyral) resin in the soft layer.

Embodiment 8 is polymer interlayer including any of the features of embodiments 1 to 7, wherein the plasticized resin composition in the soft layer of the polymer interlayer has a glass transition temperature ($T_g$) less than 20.0° C.

Embodiment 9 is a polymer interlayer including any of the features of embodiments 1 to 8, wherein the resin composition in the soft layer is produced by the process of reacting a first poly(vinyl alcohol) resin having a first degree of hydrolysis with a butyraldehyde to form a reaction mixture, adding a second poly(vinyl alcohol) resin with a second degree of hydrolysis to the reaction mixture, and allowing the second poly(vinyl alcohol) resin to react with the butyraldehyde to form a resin having a dispersity in composition of at least 0.40.

Embodiment 10 is a polymer interlayer including any of the features of embodiments 1 to 9, wherein the resin composition in the soft layer is produced by the process of mixing a first poly(vinyl alcohol) resin and a second poly(vinyl alcohol) resin composition to form a mixture, wherein the first poly(vinyl alcohol) resin and a second poly(vinyl alcohol) resin composition each have a degree of hydrolysis and the difference between the degree of hydrolysis of the first poly(vinyl alcohol) resin and a second poly(vinyl alcohol) resin is at least 2%, wherein the mixture is reacted with butyraldehyde to produce a resin having a dispersity in composition of at least 0.40.

Embodiment 11 is a polymer interlayer including any of the features of embodiments 1 to 10, wherein the polymer interlayer further comprises a second stiff layer, and wherein the soft layer is adjacent to and between the stiff layers.

Embodiment 12 is a polymer interlayer including any of the features of embodiments 1 to 11, wherein the third dispersity in composition is at least 10% greater than the first dispersity in composition and at least 10% greater than the second dispersity in composition.

Embodiment 13 is a polymer interlayer including any of the features of embodiments 1 to 12, wherein the soft layer poly(vinyl butyral) resin composition has an average residual vinyl acetate content of from about 1 mole % to about 28 mole %.

Embodiment 14 is a polymer interlayer including any of the features of embodiments 1 to 13, wherein the poly(vinyl butyral) resin composition in the soft layer comprises a first poly(vinyl butyral) resin having a first residual hydroxyl content and a first dispersity in composition and a second poly(vinyl butyral) resin having a second residual hydroxyl content and a second dispersity in composition, wherein the difference between the first residual hydroxyl content and the second residual hydroxyl content is at least 1.0 weight percent, and wherein the soft layer has a third dispersity in composition of at least 0.40 and wherein the third dispersity in composition is greater than both the first dispersity in composition and the second dispersity in composition.

Embodiment 15 is a polymer interlayer including any of the features of embodiments 1 to 14, wherein the polymer interlayer has a damping loss factor (η) (as measured by Mechanical Impedance Measurement according to ISO 16940) of at least about 0.16 measured at two or more different temperatures selected from 10° C., 20° C. and 30° C.

Embodiment 16 is a polymer interlayer including any of the features of embodiments 1 to 15, wherein the soft layer of the polymer interlayer has a dispersity in composition of at least 0.42.

EXAMPLES

The improved sound insulation (or damping) properties of a multilayer interlayer can be most readily appreciated by a comparison of multilayer (tri-layer) interlayers having a soft layer comprising a resin composition having a high dispersity (of at least 0.40), and at least one plasticizer to multilayer interlayers having a soft layer comprising a resin composition having a low dispersity (of 0.39 or less) and at least one plasticizer.

Resin compositions having varying residual hydroxyl and residual acetate contents and their properties are summarized in Table 1 below. Eleven Comparative Resins (CR-1 to CR-11) comprising a single resin and nine Disclosed Resins (DR-1 to DR-9) comprising either a blend of resins (DR-1 to DR-7, made from the various individual Comparative Resins) or a resin composition produced according to methods of the invention as described below (DR-8 and DR-9) were used in the Examples. Table 2 shows which resin types (level of residual hydroxyl level and residual acetate level) were blended to make DR-1 to DR-7, as well as the dispersity in composition properties of Disclosed Resins DR-1 to DR-7. In some cases, the resin tested for dispersity in composition may have been from a different lot of resin than the resin in the blends, but the resin properties were the same. The Comparative Resins have a dispersity in composition of 0.39 or less (low dispersity), while the Disclosed Resins have a high dispersity in composition of at least 0.40, and specifically in resins DR-1 to DR-9, about 0.41 or more.

Disclosed Resins DR-1 to DR-7 comprise blends of resins that were obtained by mixing two different starting resins having different residual acetate and/or residual hydroxyl levels to form a resin blend or composition. The properties of Disclosed Resins DR-1 to DR-7 are shown in Table 1. For resins DR-8 and DR-9, instead of a blend of two resins, the resin compositions were produced as follows according to the methods of the invention. For DR-8, a first PVOH resin having about 98-100% hydrolysis was blended in a ratio of 1:1 (wt./wt.) with a second PVOH resin having about 88% hydrolysis and reacted with butyraldehyde and an acid catalyst (as known in the art) to form a resulting resin having about 12.4 wt. % residual hydroxyl content and about 7 mole % residual acetate content, and having a dispersity of 0.59. For DR-9, a first PVOH resin having about 98-100% hydrolysis was blended in a ratio of 1:1 (wt./wt.) with a second PVOH resin having about 78% hydrolysis and reacted with butyraldehyde and an acid catalyst (as known in the art) to form a resulting resin having about 11.3 wt. % residual hydroxyl content and about 12 mole % residual acetate content, and having a dispersity of 0.48. The properties of Disclosed Resins DR-8 and DR-9 are also shown in Table 1 below.

is a blend of Comparative Resins CR-1 and CR-6), the dispersity in composition of the blend is 0.67 while the highest dispersity in composition of any individual resin in

TABLE 1

| Resin | Number of PVB resins | First resin residual hydroxyl content wt. % | First resin residual acetate content mole % | Second resin residual hydroxyl content wt. % | Second resin residual acetate content mole % | Ratio of first resin to second resin | Average residual hydroxyl wt. % | Average residual acetate content mole % | Dispersity in composition (measured) |
|---|---|---|---|---|---|---|---|---|---|
| CR-1  | 1 | 10.5 | 1  |      |    |       | 10.5 | 1    | 0.31 |
| CR-2  | 1 | 10.7 | 1  |      |    |       | 10.7 | 1    | 0.33 |
| CR-3  | 1 | 12.5 | 10 |      |    |       | 12.5 | 10   | 0.37 |
| CR-4  | 1 | 12.5 | 12 |      |    |       | 12.5 | 12   | 0.34 |
| CR-5  | 1 | 16.3 | 1  |      |    |       | 16.3 | 1    | 0.39 |
| CR-6  | 1 | 12.5 | 22 |      |    |       | 12.5 | 22   | 0.39 |
| CR-7  | 1 | 9    | 1  |      |    |       | 9    | 1    | 0.31 |
| CR-8  | 1 | 9.6  | 1  |      |    |       | 9.6  | 1    | 0.32 |
| CR-9  | 1 | 13   | 1  |      |    |       | 13   | 1    | 0.29 |
| CR-10 | 1 | 18.7 | 1  |      |    |       | 18.7 | 1    | 0.36 |
| CR-11 | 1 | 11.5 | 1  |      |    |       | 11.5 | 1    | 0.30 |
| DR-1  | 2 | 9.6  | 1  | 11.5 | 1  | 50:50 | 10.5 | 1    | 0.41 |
| DR-2  | 2 | 9.6  | 1  | 13   | 1  | 75:25 | 10.5 | 1    | 0.58 |
| DR-3  | 2 | 9.6  | 1  | 13   | 1  | 50:50 | 11.3 | 1    | 0.68 |
| DR-4  | 2 | 9.6  | 1  | 16.3 | 1  | 75:25 | 11.3 | 1    | 0.72 |
| DR-5  | 2 | 9.6  | 1  | 16.3 | 1  | 50:50 | 13   | 1    | 0.72 |
| DR-6  | 2 | 10.5 | 1  | 12.5 | 12 | 50:50 | 11.5 | 6.5  | 0.42 |
| DR-7  | 2 | 10.5 | 1  | 12.5 | 22 | 50:50 | 11.5 | 11.5 | 0.67 |
| DR-8* | 1 |      |    |      |    |       | 12.4 | 7    | 0.59 |
| DR-9* | 1 |      |    |      |    |       | 11.3 | 12   | 0.48 |

*Note - DR-8 and DR-9 are not blends of two resins

In Table 1 above, as previously noted, DR-8 and DR-9 are not blends or mixtures of two starting PVB resins, but instead were made according to the method previously described starting with different PVOH resins.

Table 1 shows that soft or core layer resin compositions can be produced that have broad distributions or a high dispersity in composition. Comparing the Disclosed Resins to the Comparative Resins, all of the Disclosed Resins have a dispersity in composition of greater than 0.40, or even at least 0.41 or higher or at least 0.42 or higher.

Table 2 shows the starting Comparative Resins used to produce the Disclosed Resins (DR-1 to DR-7) having a high dispersity in composition.

the blend is 0.39 (for CR-6). As shown in Table 2, blending two resins having low dispersity in composition increases the dispersity in composition of the blend by at least 10%, and in the specific cases, by at least almost 20% or more, and in some blends, 30% or more, or 40% or more, or even 50% or more (see DR-3).

Exemplary soft (core) layers (designated as "Disclosed Layers" DL-1 to DL-16 in Tables 3 to 6 below) and comparative soft (core) layers (designated as "Comparative Layers" CL-1 to CL-3 in the Tables below) were produced by mixing and melt-extruding 100 parts of a poly(vinyl butyral) resin composition (either the Comparative Resins, CR-1 to C-11 or Disclosed Resins, DR-1 to DR-9) and

TABLE 2

| Resin | Resin 1 | Resin 2 | Highest Dispersity of Resin 1 and Resin 2 | Dispersity of Disclosed Resin Blend | Dispersity Difference (Resin Blend − Highest Resin Dispersity) | Dispersity Increase (from Highest Dispersity to Disclosed Resin) |
|---|---|---|---|---|---|---|
| DR-1 | CR-8 | CR-11 | 0.32 | 0.41 | 0.09 | 28% |
| DR-2 | CR-8 | CR-9  | 0.32 | 0.58 | 0.26 | 45% |
| DR-3 | CR-8 | CR-9  | 0.32 | 0.68 | 0.36 | 53% |
| DR-4 | CR-8 | CR-5  | 0.39 | 0.72 | 0.33 | 46% |
| DR-5 | CR-8 | CR-5  | 0.39 | 0.72 | 0.33 | 46% |
| DR-6 | CR-1 | CR-4  | 0.34 | 0.42 | 0.08 | 19% |
| DR-7 | CR-1 | CR-6  | 0.39 | 0.67 | 0.28 | 42% |

As shown in Table 2 above, when blending two starting resins of different dispersities in composition, the dispersity of the blended composition is considerably higher than that of even the starting resin having the highest dispersity in composition. For example, Disclosed Resin DR-2 (which is a blend of Comparative Resins CR-8 and CR-9) has a dispersity in composition of 0.58 while the highest dispersity in composition of any individual resin in the blend is only 0.32 (for CR-8), and for Disclosed Resin DR-7 (which various amounts of 3GEH plasticizer, and other common additives (as described above), in the amounts shown in the Tables. The Disclosed Layers and Comparative Layers were then used to construct various multilayered interlayers by combining them with two stiff outer (skin) layers as shown in the Tables as Comparative Interlayers and Disclosed Interlayers (CI-1 to CI-4 and DI-1 to DI-26 respectively). The stiff (skin) layers each had a thickness of 15 mils in the multilayer interlayers and were made by melt-extruding 100 parts of poly(vinyl butyral) resin having a residual hydroxyl content of about 19 wt. % and a residual acetate content of 2%, and 38 parts 3GEH plasticizer, and other common additives. The multilayer interlayers all have the construction: Stiff layer//Soft layer//Stiff layer (or Skin layer//Core layer//Skin layer).

These Examples and the data in Tables 3 to 6 demonstrate that the sound damping properties can be improved and achieved over a range of temperatures when a resin composition having a high dispersity is used in the soft layer.

In Tables 3 to 6 below, soft layers constructed from different Disclosed Resins having different dispersities in composition are compared to soft layers comprising a resin composition having a low dispersity. Glass transition temperatures, damping loss factors and dispersity values are shown in Tables 3 to 6 below.

essentially unchanged at 30° C. when compared to those of the Comparative Interlayers. For the 10 mils thick core layers, the same but more pronounced trends were observed, where at plasticizer levels of 65, 70 and 75 phr, damping loss factors are higher at 10° C. and 20° C. and essentially unchanged at 30° C. At 60 phr, the damping loss factor increased at 20° C. and 30° C. and remained unchanged at 10° C.

These Examples illustrate the benefit of having a resin composition with a high dispersity formed from two resins of different residual hydroxyl contents (9.6 and 11.5 wt. %, respectively) in the soft (core) layer. In these Examples, the average residual hydroxyl content level of the Disclosed Layers is equal to the residual hydroxyl level of the resin in the Comparative Layer, and the sound insulation property of the multilayer interlayer is improved and broadened in the

TABLE 3

| | | | | | | | | | Glass transition temperatures of individual plasticized resins (° C.) | | Observed Core layer glass transition temperature (° C.) | Damping loss factor (η) at temperature (° C.) | | |
|---|---|---|---|---|---|---|---|---|---|---|---|---|---|---|
| Interlayer No. | Core layer no. | PVB resin used | First resin residual hydroxyl content (wt. %) | Second resin residual hydroxyl content (wt. %) | Average residual hydroxyl content (wt. %) | Plasticizer content (phr) | Thickness (mil) | Dispersity in composition (measured) | $T_{g1}$ | $T_{g2}$ | $T_g$ | 10 | 20 | 30 |
| CI-1 | CL-1 | CR-1 | 10.5 | — | 10.5 | 75 | 5 | 0.31 | −2.5 | — | −2.5 | 0.27 | 0.44 | 0.27 |
| DI-1 | DL-1 | DR-1 | 9.6 | 11.5 | 10.5 | 75 | 5 | 0.41 | −4.5 | 1.9 | 0.2 | 0.34 | 0.50 | 0.24 |
| DI-2 | DL-2 | DR-1 | 9.6 | 11.5 | 10.5 | 70 | 5 | 0.41 | −2.2 | 3.7 | 1.4 | 0.39 | 0.54 | 0.27 |
| DI-3 | DL-3 | DR-1 | 9.6 | 11.5 | 10.5 | 65 | 5 | 0.41 | 0.4 | 5.8 | 3.4 | 0.21 | 0.52 | 0.34 |
| DI-4 | DL-4 | DR-1 | 9.6 | 11.5 | 10.5 | 60 | 5 | 0.41 | 3 | 8.1 | 6.2 | 0.20 | 0.51 | 0.36 |
| CI-2 | CL-1 | CR-1 | 10.5 | — | 10.5 | 75 | 10 | 0.31 | −2.5 | — | −2.5 | 0.28 | 0.45 | 0.26 |
| DI-5 | DL-1 | DR-1 | 9.6 | 11.5 | 10.5 | 75 | 10 | 0.41 | −4.5 | 1.9 | 0.2 | 0.42 | 0.50 | 0.25 |
| DI-6 | DL-2 | DR-1 | 9.6 | 11.5 | 10.5 | 70 | 10 | 0.41 | −2.2 | 3.7 | 1.4 | 0.37 | 0.54 | 0.25 |
| DI-7 | DL-3 | DR-1 | 9.6 | 11.5 | 10.5 | 65 | 10 | 0.41 | 0.4 | 5.8 | 3.4 | 0.31 | 0.56 | 0.28 |
| DI-8 | DL-4 | DR-1 | 9.6 | 11.5 | 10.5 | 60 | 10 | 0.41 | 3 | 8.1 | 6.2 | 0.27 | 0.62 | 0.34 |

Table 3 compares Comparative Interlayers having soft (core) layers formed from a resin composition having a low dispersity and a residual hydroxyl content of about 10.5 wt. % with Disclosed Interlayers having soft (core) layers comprising a resin composition having a high dispersity and an average residual hydroxyl content of about 10.5 wt. % (delta residual hydroxyl content between the resins in the composition of about 1.9 wt. %). Core layers were formed in two thicknesses, 5 mils and 10 mils, and at varying plasticizer levels of from 60 phr to 75 phr. Glass transition temperatures for the individual plasticized resins in the blend are shown, as well as the observed glass transition temperature of the core layer. Since the individual glass transition temperatures do not differ by a large amount in these layers, only one glass transition temperature was seen and measured on the core layer, which is between the two individual glass transition temperatures.

As shown in Table 3, the core layer resin compositions of the Disclosed Layers, which comprise a blend of two resins with different residual hydroxyl contents, all have a dispersity of 0.41, compared to the dispersity of the resin in the Comparative Layer, which comprises only a resin composition having a narrow distribution or low dispersity of 0.31.

Damping loss factor was measured on all the interlayers, as shown in Table 3. For the Disclosed Interlayers having 5 mil thick core layers, at plasticizer levels of 70 and 75 phr, damping loss factors are higher at 10° C. and 20° C. and temperature range of 10° C. to 30° C. By further modulating the amount of plasticizer in the soft (core), the sound insulation property can be improved at either higher or lower temperature end. This is clearly illustrated by comparing the Comparative Interlayer, CI-1, where the damping loss factor is maximized at 20° C. (and it decreases at both 10° C. and 30° C.) with the Disclosed Interlayers, such as DI-1 and DI-2, where the damping loss factor is also maximized at 20° C. but increases at 10° C. and remains almost unchanged at 30° C. (i.e., does not decrease). For the Disclosed Interlayers DI-3 and DI-4, the damping loss factor is also maximized at 20° C. but also increases at 30° C. Comparing CI-2 with DI-5, DI-6 and DI-7 shows a similar trend, where the damping loss factor is maximized at 20° C. (and it decreases at both 10° C. and 30° C.) for the Comparative Interlayer, CI-2, while the damping loss factor is also maximized at 20° C. but also increases at 10° C. and remains almost unchanged at 30° C. for the Disclosed Interlayers. For the Disclosed Interlayer, DI-8, the damping loss factor is also maximized at 20° C. but also increases at 30° C. while remaining essentially unchanged at 10° C., providing better sound insulation over a broader range of temperatures.

Table 4 compares interlayers having a Comparative Layers (CL-1) with a residual hydroxyl content of about 10.5 wt. % with Disclosed Layers (DL-5 to DL-8) comprising a resin composition that is a blend of resins and has an average residual hydroxyl content of about 11.3 wt. % and a delta residual hydroxyl content of about 3.4 wt. %. The core layers were formed in two thicknesses, 5 mils and 10 mils, and at varying plasticizer levels of from 60 phr to 75 phr. Glass transition temperatures for the plasticized resins are shown, as well as the glass transition temperature of the core layer. Again, since the individual glass transition temperatures do not differ by a large amount, only one glass transition temperature is measured on the core layer, which is between the two individual glass transition temperatures.

layer, the sound insulation of the interlayers can be improved over a broader temperature range by increasing the core layer thickness for an interlayer having a core layer with a high dispersity in composition.

This is clearly illustrated by comparing the Comparative Interlayer, CI-1, where the damping loss factor is maximized at 20° C. (and it decreases at both 10° C. and 30° C.) with the Disclosed Interlayers, such as DI-9, DI-10, DI-11 and DI-12, where the damping loss factor is also maximized at

TABLE 4

| | | | | | | | | | Glass transition temperatures of individual plasticized resins (° C.) | | Observed Core layer glass transition temperature | Damping loss factor ($\eta$) | | |
|---|---|---|---|---|---|---|---|---|---|---|---|---|---|---|
| Interlayer No. | Core Layer No. | PVB resin used | First resin residual hydroxyl content (wt. %) | Second resin residual hydroxyl content (wt. %) | Average residual hydroxyl content (wt. %) | Plasticizer content (phr) | thick- ness (mil) | Dispersity in composition (measured) | First $T_{g1}$ | Second $T_{g2}$ | (° C.) $T_g$ | at temperature (° C.) | | |
| | | | | | | | | | | | | 10 | 20 | 30 |
| CI-1 | CL-1 | CR-1 | 10.5 | — | 10.5 | 75 | 5 | 0.31 | −2.5 | — | −2.5 | 0.27 | 0.44 | 0.27 |
| DI-9 | DL-5 | DR-3 | 9.6 | 13 | 11.3 | 75 | 5 | 0.68 | −4.5 | 4.9 | −1.0 | 0.17 | 0.40 | 0.34 |
| DI-10 | DL-6 | DR-3 | 9.6 | 13 | 11.3 | 70 | 5 | 0.68 | −2.2 | 6.7 | 1.0 | 0.14 | 0.34 | 0.33 |
| DI-11 | DL-7 | DR-3 | 9.6 | 13 | 11.3 | 65 | 5 | 0.68 | 0.4 | 8.7 | 3.8 | 0.10 | 0.33 | 0.40 |
| DI-12 | DL-8 | DR-3 | 9.6 | 13 | 11.3 | 60 | 5 | 0.68 | 3 | 10.3 | 6.3 | 0.12 | 0.36 | 0.40 |
| CI-2 | CL-1 | CR-1 | 10.5 | — | 10.5 | 75 | 10 | 0.31 | −2.5 | — | −2.5 | 0.28 | 0.45 | 0.26 |
| DI-13 | DL-5 | DR-3 | 9.6 | 13 | 11.3 | 75 | 10 | 0.68 | −4.5 | 4.9 | −1.0 | 0.34 | 0.49 | 0.28 |
| DI-14 | DL-6 | DR-3 | 9.6 | 13 | 11.3 | 70 | 10 | 0.68 | −2.2 | 6.7 | 1.0 | 0.26 | 0.55 | 0.40 |
| DI-15 | DL-7 | DR-3 | 9.6 | 13 | 11.3 | 65 | 10 | 0.68 | 0.4 | 8.7 | 3.8 | 0.21 | 0.55 | 0.41 |
| DI-16 | DL-8 | DR-3 | 9.6 | 13 | 11.3 | 60 | 10 | 0.68 | 3 | 10.3 | 6.3 | 0.15 | 0.47 | 0.42 |

As shown in Table 4, the core layer resin compositions of the Disclosed Layers, which comprise a resin composition comprising a blend of two resins with different residual hydroxyl contents, all have a dispersity of 0.68, compared to the dispersity of the resin in the Comparative Layer, which has a narrow distribution or low dispersity in composition of 0.31.

Damping loss factor was measured on all the interlayers, as shown in Table 4. For the 5 mils core layers, at plasticizer levels of 60, 65, 70 and 75 phr, damping loss factor is lower than that of the Comparative Interlayer at 10° C. and 20° C. and higher at 30° C. The lower damping loss factors for the Disclosed Interlayers at 10° C. and 20° C. are due to higher average residual hydroxyl content of 11.3 (vs. 10.5 for the Comparative Interlayer) and the thinner core layer thickness of 5 mils. When the core layer thickness is increased from 5 mils to 10 mils, there is a significant increase in damping loss factor at 10° C. and 20° C. At a plasticizer level of 75 phr, the damping loss factor of the Disclosed Interlayers is better than that of the Comparative Interlayer at all three temperatures. When reducing the plasticizer level to 70 phr or 60 phr, there is a reduction in damping loss factor at 10° C., but the damping loss factor improves further at both 20° C. and 30° C. for the Disclosed Interlayers. Therefore, even with higher average residual hydroxyl content in the core 20° C. but also increases at 30° C. The same trend is shown when comparing the core layers at the thickness of 10 mils, where for CI-2, the damping loss factor is maximized at 20° C. (and it decreases at both 10° C. and 30° C.), but for DI-13, DI-14, DI-15 and DI-16, the damping loss factor is also maximized at 20° C. but also increases at 30° C., providing better sound insulation over a broader range of temperatures.

Table 5 compares interlayers having Comparative Layers with a residual hydroxyl content of about 13 wt. % with Disclosed Layers comprising a resin composition comprising two resins with an average residual hydroxyl content of about 13 wt. % and a delta residual hydroxyl content of about 6.7 wt. %. Core layers were formed in two thicknesses, 5 mils and 10 mils, and at plasticizer levels of 60 phr and 65 phr. Glass transition temperatures for the individual plasticized resins are shown, as well as the glass transition temperatures of the core layer. At the higher delta residual hydroxyl level (i.e., delta residual hydroxyl content of 6.7 wt. %), the two different glass transition temperatures are measurable in the Disclosed Interlayers since there is a larger difference between the two temperatures.

TABLE 5

| | | | | | | | | | Glass transition temperatures of individual plasticized resins (° C.) | | Observed Core layer glass transition temperatures (° C.) | | Damping loss factor (η) at temperature (° C.) | | |
|---|---|---|---|---|---|---|---|---|---|---|---|---|---|---|---|
| Interlayer No. | Core Layer No. | PVB Resin Used | First resin residual hydroxyl content (wt. %) | Second resin residual hydroxyl content (wt. %) | Average residual hydroxyl content (wt. %) | Plasticizer content (phr) | thickness (mil) | Dispersity in composition | First $T_{g1}$ | Second $T_{g2}$ | First $T_{g1}$ | Second $T_{g2}$ | 10 | 20 | 30 |
| CI-3 | CL-2 | CR-9 | 13 | — | 13 | 65 | 5 | 0.29 | 8.7 | — | 8.7 | — | 0.06 | 0.24 | 0.45 |
| CI-4 | CL-3 | CR-9 | 13 | — | 13 | 60 | 5 | 0.29 | 10.3 | — | 10.3 | — | 0.05 | 0.21 | 0.43 |
| DI-17 | DL-9 | DR-5 | 9.6 | 16.3 | 13 | 65 | 5 | 0.72 | 0.4 | 12.3 | −3.4 | 14 | 0.08 | 0.27 | 0.49 |
| DI-18 | DL-10 | DR-5 | 9.6 | 16.3 | 13 | 60 | 5 | 0.72 | 3 | 14.5 | −1 | 15.9 | 0.06 | 0.18 | 0.41 |
| DI-19 | DL-9 | DR-5 | 9.6 | 16.3 | 13 | 65 | 10 | 0.72 | 0.4 | 12.3 | −3.4 | 14 | 0.20 | 0.47 | 0.39 |
| DI-20 | DL-10 | DR-5 | 9.6 | 16.3 | 13 | 60 | 10 | 0.72 | 3 | 14.5 | −1 | 15.9 | 0.15 | 0.42 | 0.41 |

As shown in Table 5, the resin compositions of the Disclosed Layers, which comprise a composition that is a blend of two resins with different residual hydroxyl contents, all have a dispersity of 0.72, compared to the dispersity in composition of the Comparative Layer resin, which has a narrow distribution or low dispersity of 0.29.

Damping loss factor was measured on all the interlayers, as shown in Table 5. For the 5 mils core layers, at all plasticizer levels, damping loss factor of the Disclosed Interlayers is similar to that of the Comparative Interlayers at all three temperatures. For the 10 mils core layers, at all plasticizer levels, damping loss factor is significantly higher at 10° C. and 20° C. and slightly lower at 30° C. As shown in Table 5, when there is a larger difference in residual hydroxyl content between the two resins, the sound insulation can be improved at lower temperatures by increasing the core layer thickness.

Table 6 compares interlayers having Comparative Layers with a residual hydroxyl content of about 10.5 wt. % with Disclosed Layers comprising a resin composition comprising two resins with an average residual hydroxyl content of about 10.5 wt. % and 11.3 wt. % respectively.

Disclosed Interlayers DI-5, DI-6 and DI-7 to DI-21, DI-22 and DI-23 have the same average residual hydroxyl contents but the resin compositions are different Disclosed Resins. The Disclosed Resin having an average residual hydroxyl content of about 10.5 wt. % was obtained by blending two resins (CR-8 at 9.6 wt. % and CR-11 at 11.5 wt. % residual hydroxyl content, respectively, with a delta residual hydroxyl content of 1.9 wt. %) at a ratio 50:50. This same average residual hydroxyl content of about 10.5 wt. % was also be obtained by blending two different resins (CR-8 at 9.6 wt. % and CR-9 at 13 wt. % residual hydroxyl content, respectively, with a delta residual hydroxyl content of 3.4 wt. %) at a ratio of 75:25. Similarly, Disclosed Interlayers DI-13, DI-14 and DI-15 to DI-24, DI-25 and DI-26 have the same average residual hydroxyl content that was obtained by blending two resins (CR-8 at 9.6 wt. % and CR-9 at 13 wt. % residual hydroxyl content, respectively, with a delta residual hydroxyl content of 3.4 wt. %) at a ratio 50:50 and by blending two different resins (CR-8 at 9.6 wt. % and CR-5 at 16.3 wt. % residual hydroxyl content, respectively, with a delta residual hydroxyl content of 6.7 wt. %) at a ratio of 75:25.

TABLE 6

| | | | | | | | | | Glass transition temperatures of individual plasticized resins (° C.) | | Observed Core layer glass transition temperatures (° C.) | | Damping loss factor (η) at temperature (° C.) | | |
|---|---|---|---|---|---|---|---|---|---|---|---|---|---|---|---|
| Interlayer No. | Core layer no. | PVB resin Used | First resin residual hydroxyl content (wt. %) | Second resin residual hydroxyl content (wt. %) | Average residual hydroxyl content (wt. %) | Plasticizer content (phr) | thickness (mil) | Dispersity in composition (measured) | First $T_{g1}$ | Second $T_{g2}$ | First $T_{g1}$ | Second $T_{g2}$ | 10 | 20 | 30 |
| CI-2 | CL-1 | CR-1 | 10.5 | — | 10.5 | 75 | 10 | 0.31 | −2.5 | — | −2.5 | — | 0.28 | 0.45 | 0.26 |
| DI-5 | DL-1 | DR-1 | 9.6 | 11.5 | 10.5 | 75 | 10 | 0.41 | −4.5 | 1.9 | 0.2 | — | 0.42 | 0.50 | 0.25 |
| DI-6 | DL-2 | DR-1 | 9.6 | 11.5 | 10.5 | 70 | 10 | 0.41 | −2.2 | 3.7 | 1.4 | — | 0.37 | 0.54 | 0.25 |
| DI-7 | DL-3 | DR-1 | 9.6 | 11.5 | 10.5 | 65 | 10 | 0.41 | 0.4 | 5.8 | 3.4 | — | 0.31 | 0.56 | 0.28 |
| DI-21 | DL-11 | DR-2 | 9.6 | 13 | 10.5 | 75 | 10 | 0.58 | −4.5 | 4.9 | −3.7 | — | 0.38 | 0.49 | 0.27 |
| DI-22 | DL-12 | DR-2 | 9.6 | 13 | 10.5 | 70 | 10 | 0.58 | −2.2 | 6.7 | −2.3 | — | 0.33 | 0.54 | 0.29 |
| DI-23 | DL-13 | DR-2 | 9.6 | 13 | 10.5 | 65 | 10 | 0.58 | 0.4 | 8.7 | 0.4 | — | — | — | — |
| DI-13 | DL-5 | DR-3 | 9.6 | 13 | 11.3 | 75 | 10 | 0.68 | −4.5 | 4.9 | −1 | — | 0.34 | 0.49 | 0.28 |
| DI-14 | DL-6 | DR-3 | 9.6 | 13 | 11.3 | 70 | 10 | 0.68 | −2.2 | 6.7 | 1 | — | 0.26 | 0.55 | 0.40 |
| DI-15 | DL-7 | DR-3 | 9.6 | 13 | 11.3 | 65 | 10 | 0.68 | 0.4 | 8.7 | 3.8 | — | 0.21 | 0.55 | 0.41 |
| DI-24 | DL-14 | DR-4 | 9.6 | 16.3 | 11.3 | 75 | 10 | 0.72 | −4.5 | 9.5 | −5.0 | 24 | 0.33 | 0.44 | 0.32 |
| DI-25 | DL-15 | DR-4 | 9.6 | 16.3 | 11.3 | 70 | 10 | 0.72 | −2.2 | 10.7 | −2.7 | 25.8 | 0.27 | 0.42 | 0.31 |
| DI-26 | DL-16 | DR-4 | 9.6 | 16.3 | 11.3 | 65 | 10 | 0.72 | 0.4 | 12.3 | 0 | 27.1 | 0.26 | 0.46 | 0.33 |

Core layers were formed at a thickness of 10 mils and at varying plasticizer levels of from 65 phr to 75 phr. Glass transition temperatures for the individual plasticized resins are shown, as well as the glass transition temperature(s) of the core layer. In some cases, since the individual glass transition temperatures do not differ by a large amount or the glass transition peak of the second plasticized resin is weak due to the presence of the resin at a smaller amount, only one glass transition temperature is measured on the core layer, which is between the two individual glass transition temperatures.

At the average residual hydroxyl content of about 10.5 wt. %, when the delta or difference in residual hydroxyl content between the first and second resin is smaller (1.9 wt. %), damping loss factor is improved at 10 and 20° C. for 5 mils core layer (DI-5 to DI-7). Increasing the delta or difference in residual hydroxyl content from 1.9% to 3.4%, such as by increasing the residual hydroxyl of the second resin from 11.5% to 13%, results in a more balanced increase in damping loss factor at all three temperatures (DI-21 to DI-22).

At the average residual hydroxyl content of about 11.3 wt. % and the difference in residual hydroxyl content between the first and second resin of 3.4 wt. %, damping loss factor is improved at 20 and 30° C. (DI-13 to DI-15). Increasing the difference from 3.4% to 6.7%, such as by increasing the residual hydroxyl of the second resin from 13% to 16.3%, results in an increase in damping loss factor at 30° C. (DI-25 and DI-26) at plasticizer levels of 65 and 70 and a more balanced increase at all three temperatures (DI-24).

This is clearly illustrated by comparing the Comparative Interlayer, CI-2, where the damping loss factor is maximized at 20° C. (and it decreases at both 10° C. and 30° C.) with the Disclosed Interlayers, such as DI-5, DI-6, DI-7, DI-21 and DI-22, where the damping loss factor is also maximized at 20° C. but also increases at 10° C. and remains essentially unchanged compared to the Comparative Interlayer at 30° C. Comparing Comparative Interlayer CI-2 with the Disclosed Interlayers DI-13, DI-14, DI-15, DI-24, DI-25 and DI-26, the damping loss factor is also maximized at 20° C. but increases at 30° C. and drops slightly in some cases and remains essentially unchanged in others compared to the Comparative Interlayer at 10° C. Interlayers having two resins having different hydroxyl contents in different ratios and different dispersities can be combined to form a resin composition that provides better sound insulation over a broader range of temperatures as well as a higher dispersity in composition than the individual resins.

As shown in Table 6, the resin compositions of the Disclosed Layers, which comprise a blend of two resins with different residual hydroxyl contents, all have a dispersity of 0.41 or higher (or even 0.58 or higher), compared to the dispersity of the resin composition in the Comparative Layer, which comprises only a resin composition having a narrow distribution or low dispersity of 0.31.

In conclusion, the multilayered interlayers with soft layers described herein have numerous advantages over conventional multilayered interlayers previously utilized in the art. In general, in comparison to multilayered interlayers previously utilized in the art, the multilayered interlayers comprising soft layers as described herein, having a broader distribution or dispersity in composition, such as when a blend of two (or more) different resins having different hydroxyl contents and glass transition temperatures is used, have an improved sound insulation performance and broaden the temperature range at which the interlayers perform. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

The invention claimed is:

1. A polymer interlayer having improved sound insulation, the polymer interlayer comprising:
   a stiff layer comprising a poly(vinyl butyral) resin composition and a plasticizer; and
   a soft layer comprising a poly(vinyl butyral) resin composition and a plasticizer, wherein the soft layer has a dispersity in composition of at least 0.40; and
   wherein the polymer interlayer has a damping loss factor (η) (as measured by Mechanical Impedance Measurement according to ISO 16940) of at least about 0.15 measured at two or more different temperatures selected from 10° C., 20° C. and 30° C.

2. The polymer interlayer of claim 1, wherein the poly (vinyl butyral) resin composition in the soft layer comprises a first poly(vinyl butyral) resin having a first residual hydroxyl content and a second poly(vinyl butyral) resin having a second residual hydroxyl content, wherein the difference between the first residual hydroxyl content and the second residual hydroxyl content is at least 1.0 weight percent.

3. The polymer interlayer of claim 2, wherein the dispersity in composition of the resin composition in the soft layer is greater than the dispersity in composition of the first poly(vinyl butyral) resin in the soft layer and the dispersity in composition of the second poly(vinyl butyral) resin in the soft layer.

4. The polymer interlayer of claim 1, wherein the poly (vinyl butyral) resin composition in the soft layer comprises a first poly(vinyl butyral) resin having a first residual vinyl acetate content and a second poly(vinyl butyral) resin having a second residual vinyl acetate content, wherein the difference between the first residual vinyl acetate content and the second residual vinyl acetate content is at least 1.0 mole %.

5. The polymer interlayer of claim 4, wherein the dispersity in composition of the resin composition in the soft layer is greater than the dispersity in composition of the first poly(vinyl butyral) resin in the soft layer and the dispersity in composition of the second poly(vinyl butyral) resin in the soft layer.

6. The polymer interlayer of claim 1, wherein the plasticized resin composition in the soft layer of the polymer interlayer has a glass transition temperature ($T_g$) less than 20.0° C.

7. The polymer interlayer of claim 1, wherein the resin composition in the soft layer is produced by the process of reacting a first poly(vinyl alcohol) resin having a first degree of hydrolysis with a butyraldehyde to form a reaction mixture, adding a second poly(vinyl alcohol) resin with a second degree of hydrolysis to the reaction mixture, and allowing the second poly(vinyl alcohol) resin to react with the butyraldehyde to form a resin having a dispersity in composition of at least 0.40.

8. The polymer interlayer of claim 1, wherein the resin composition in the soft layer is produced by the process of mixing a first poly(vinyl alcohol) resin and a second poly(vinyl alcohol) resin composition to form a mixture, wherein the first poly(vinyl alcohol) resin and a second poly(vinyl alcohol) resin composition each have a degree of hydrolysis and the difference between the degree of hydrolysis of the first poly(vinyl alcohol) resin and a second poly(vinyl alcohol) resin is at least 2%, wherein the mixture is reacted with butyraldehyde to produce a resin having a dispersity in composition of at least 0.40.

9. The polymer interlayer of claim 1, wherein the polymer interlayer further comprises a second stiff layer, and wherein the soft layer is adjacent to and between the stiff layers.

10. A polymer interlayer having improved sound insulation, the polymer interlayer comprising:
a stiff layer comprising a poly(vinyl butyral) resin composition and a plasticizer; and
a soft layer comprising a poly(vinyl butyral) resin composition, wherein the soft layer comprises a first poly(vinyl butyral) resin having a first dispersity in composition and a second poly(vinyl butyral) resin having a second dispersity in composition, and a plasticizer,
wherein the soft layer has a third dispersity in composition and wherein the third dispersity in composition is at least 0.40 and wherein the third dispersity in composition is greater than both the first dispersity in composition and the second dispersity in composition; and
wherein the polymer interlayer has a damping loss factor (η) (as measured by Mechanical Impedance Measurement according to ISO 16940) of at least about 0.15 measured at two or more different temperatures selected from 10° C., 20° C. and 30° C.

11. The polymer interlayer of claim 10, wherein the third dispersity in composition is at least 10% greater than the first dispersity in composition and at least 10% greater than the second dispersity in composition.

12. The polymer interlayer of claim 10, wherein the poly(vinyl butyral) resin composition in the soft layer comprises a first poly(vinyl butyral) resin having a first residual hydroxyl content and a second poly(vinyl butyral) resin having a second residual hydroxyl content, wherein the difference between the first residual hydroxyl content and the second residual hydroxyl content is at least 1.0 weight percent.

13. The polymer interlayer of claim 10, wherein the poly(vinyl butyral) resin composition in the soft layer comprises a first poly(vinyl butyral) resin having a first residual vinyl acetate content and a second poly(vinyl butyral) resin having a second residual vinyl acetate content, wherein the difference between the first residual vinyl acetate content and the second residual vinyl acetate content is at least 1.0 mole %.

14. The polymer interlayer of claim 10, wherein the plasticized resin composition in the soft layer of the polymer interlayer has a glass transition temperature ($T_g$) less than 20.0° C.

15. The polymer interlayer of claim 10, wherein the polymer interlayer further comprises a second stiff layer, and wherein the soft layer is adjacent to and between the stiff layers.

16. A polymer interlayer having improved sound insulation, the polymer interlayer comprising:
a stiff layer comprising a poly(vinyl butyral) resin composition and a plasticizer; and
a soft layer comprising a poly(vinyl butyral) resin composition and a plasticizer, wherein the soft layer resin composition has an average residual hydroxyl content of from about 8 to about 16 weight % and a dispersity in composition of at least 0.40,
wherein the polymer interlayer has a damping loss factor (η) (as measured by Mechanical Impedance Measurement according to ISO 16940) of at least about 0.15 measured at two or more different temperatures selected from 10° C., 20° C. and 30° C.

17. The polymer interlayer of claim 16, wherein the soft layer poly(vinyl butyral) resin composition has an average residual vinyl acetate content of from about 1 mole % to about 28 mole %.

18. The polymer interlayer of claim 16, wherein the plasticized resin composition in the soft layer of the polymer interlayer has a glass transition temperature ($T_g$) less than 20.0° C.

19. The polymer interlayer of claim 16, wherein the polymer interlayer further comprises a second stiff layer, and wherein the soft layer is adjacent to and between the stiff layers.

20. The polymer interlayer of claim 16, wherein the poly(vinyl butyral) resin composition in the soft layer comprises a first poly(vinyl butyral) resin having a first residual hydroxyl content and a first dispersity in composition and a second poly(vinyl butyral) resin having a second residual hydroxyl content and a second dispersity in composition, wherein the difference between the first residual hydroxyl content and the second residual hydroxyl content is at least 1.0 weight percent, and wherein the soft layer has a third dispersity in composition of at least 0.40 and wherein the third dispersity in composition is greater than both the first dispersity in composition and the second dispersity in composition.

\* \* \* \* \*